United States Patent
Seftel et al.

(10) Patent No.: US 11,896,968 B2
(45) Date of Patent: Feb. 13, 2024

(54) LANTHANIDE-DOPED LAYERED DOUBLE HYDROXIDES AND METHOD OF PRODUCING SAME

(71) Applicants: VITO NV, Mol (BE); UNIVERSITEIT ANTWERPEN, Antwerp (BE)

(72) Inventors: Elena Mihaela Seftel, Mol (BE); Bart Michielsen, Mol (BE); Steven Mullens, Mol (BE); Pegie Cool, Wilrijk (BE); Vera Meynen, Wilrijk (BE)

(73) Assignees: VITO NV, Mol (BE); UNIVERSITEIT ANTWERPEN, Antwerp (BE)

( * ) Notice: Subject to any disclaimer, the term of this patent is extended or adjusted under 35 U.S.C. 154(b) by 768 days.

(21) Appl. No.: 16/955,740

(22) PCT Filed: Dec. 21, 2018

(86) PCT No.: PCT/EP2018/086734
§ 371 (c)(1),
(2) Date: Jun. 18, 2020

(87) PCT Pub. No.: WO2019/122398
PCT Pub. Date: Jun. 27, 2019

(65) Prior Publication Data
US 2020/0325031 A1    Oct. 15, 2020

(30) Foreign Application Priority Data
Dec. 22, 2017 (EP) .................................. 17209942

(51) Int. Cl.
*B01J 37/03* (2006.01)
*B01J 20/04* (2006.01)
(Continued)

(52) U.S. Cl.
CPC ........... *B01J 37/031* (2013.01); *B01J 20/043* (2013.01); *B01J 20/3085* (2013.01);
(Continued)

(58) Field of Classification Search
CPC .... B01J 37/031; B01J 20/043; B01J 20/3085; B01J 27/236; B01J 37/033; B01J 37/04; C01F 7/784; C01F 7/785; C02F 1/288
See application file for complete search history.

(56) References Cited

FOREIGN PATENT DOCUMENTS

| | | |
|---|---|---|
| CN | 105236455 B | 1/2016 |
| WO | WO-2014132183 A1 * | 9/2014 ............... C08K 9/02 |

OTHER PUBLICATIONS

The State Intellectual Property Office of People's Republic of China, First Office Action in Patent Application No. CN201880077577.9 dated May 19, 2022, which is a foreign counterpart application corresponding to this U.S. Patent Application.
(Continued)

*Primary Examiner* — James A Fiorito
(74) *Attorney, Agent, or Firm* — Kolitch Romano Dascenzo Gates LLC

(57) ABSTRACT

The present disclosure relates to a method for producing lanthanide doped layered double hydroxides (Ln-doped LDHs). The method includes the steps of preparing a carbonate free alkaline solution; preparing a solution of metal salts comprising a salt of a lanthanide; co-precipitating the alkaline solution and the solution of metal salts to form a mixture and Ln-doped LDH precipitate wherein the pH of the mixture is maintained at a constant value; aging the precipitate; and separating the precipitate from the solution. The alkaline solution is an aqueous ammonia solution. The present disclosure is also related to lanthanide-doped layered double hydroxides (La-doped LDHs) obtainable by such a (Continued)

method, as well as to the use of the lanthanide-doped layered double hydroxides obtainable by such a method.

18 Claims, 12 Drawing Sheets

(51) Int. Cl.
- *B01J 20/30* (2006.01)
- *B01J 27/236* (2006.01)
- *B01J 37/04* (2006.01)
- *C02F 1/28* (2023.01)
- *C01F 7/785* (2022.01)
- *C01F 7/784* (2022.01)
- *C02F 101/20* (2006.01)
- *C02F 103/16* (2006.01)

(52) U.S. Cl.
CPC .......... *B01J 27/236* (2013.01); *B01J 37/033* (2013.01); *B01J 37/04* (2013.01); *C01F 7/784* (2022.01); *C01F 7/785* (2022.01); *C02F 1/288* (2013.01); *C01P 2002/22* (2013.01); *C01P 2002/54* (2013.01); *C01P 2002/72* (2013.01); *C01P 2002/77* (2013.01); *C01P 2002/82* (2013.01); *C01P 2004/03* (2013.01); *C02F 1/281* (2013.01); *C02F 2101/20* (2013.01); *C02F 2103/16* (2013.01)

(56) References Cited

OTHER PUBLICATIONS

Chen, Yufeng, et al.; "Synthesis of new Tb-doped Zn—Al LDH/tryptophan hybrids and their fluorescent property"; Journal of Rare Earths, vol. 34, No. 11, Nov. 2016.

Gunawan, Poernomo, et al.; "Lanthanide-doped Layered double hydroxides intercalated with sensitizing anions: efficient energy transfer between host and guest layers"; School of Chemical and Biomedical Engineering, 2009.

Jun, Hong et al.; "Effect of metal composition in lanthanum-doped ferric-based layered double hydroxides and their calcined products on adsorption of arsenate"; The Royal Society of Chemistry, 2014.

Li, Shuo, et al.; "Friction properties of La-doped Mg/Al layered double hydroxide and intercalated product as lubricant additives", Tribology International, 2015.

European Patent Office, International Search Report and Written Opinion of the International Search Authority of the International Searching Authority, dated Mar. 22, 2019, in PCT/EP2018/086734, which is the international application to this U.S. application.

Yufeng Chen, Study on Structure and Photoluminescence of Tb-doped ZnAl—NO3 Layered Double Hydroxides Prepared by Co-precipitation, Materials Chemistry and Physics, Apr. 2016, pp. 24-31, vol. 176. Elsevier.

Yufeng Chen, Excellent Green Emission of Tb3+ Incorporated in MgAl—NO3 Layered Double Hydroxides System, Journal of Luminescence, Aug. 2017, pp. 71-77, vol. 181. Elsevier.

\* cited by examiner

LANTHANIDE-DOPED LAYERED DOUBLE HYDROXIDES AND METHOD OF PRODUCING SAME

TECHNICAL FIELD

The present disclosure is related to a method for producing lanthanide-doped layered double hydroxides (Ln-doped LDHs). The present disclosure is also related to lanthanide-doped layered double hydroxides (La-doped LDHs) obtainable by such a method, as well as to the use of the lanthanide-doped layered double hydroxides obtainable by such a method.

INTRODUCTION

Heavy metals such as Cr, Mo, W, Mn, V, Nb, Sb, etc. are found in low-grade industrial waste streams such as hydrometallurgical slags. These industrial waste streams are complex mixtures in which the by-product metals are usually present in low to very low amounts compared to the associated major metals. In the art, metal liberation by alkaline leaching is typically performed on waste streams, generating complex leachate mixtures with high pH (e.g. pH from 12 to 14) containing the valuable metals. Further treatment of these leachate mixtures is then necessary in order to separate, recover or remove the metals therefrom. However, as the pH of the leachate mixtures is high, any conventional recovery or removal treatment first requires the reduction of the pH of these mixtures to the acidic range (e.g. to a pH below 5, typically around 2 to 3) before actually proceeding with the further separation, recovery or removal of the metals. This pH reduction is often a challenging and costly operation.

The state-of-the-art regarding oxyanion uptake include sorbents of different nature or provenience, such as activated carbons, anionic exchange resins, bio-materials, waste products, or minerals, the majority thereof having low stability and/or low performance (i.e. limited sorption capacity) in alkaline environment (i.e. at pH higher than 7). For example, anionic exchange resins (such as Purolite® A830, Lewatit® MP 62, Lewatit® M 610, Lewatit® MP 64), only efficiently work at a pH lower than 7 (typically in a pH range of 1 to 4). Moreover, the sorption equilibrium for such resins is only reached after about 2 hours, the uptake of heavy metal oxyanions hence being very slow. And even in the acidic conditions (pH lower than 7), the maximum sorption capacity of many of the anionic exchange resins known in the art is about 40 mg of heavy metal oxyanions per gram of sorbent, which is relatively low.

Recently, there is an increasing interest in using a class of anionic clays known as layered double hydroxides (LDHs), or hydrotalcite-like compounds (HTlc), to remove inorganic contaminants such as oxyanions and monoatomic anions (e.g. fluoride, chloride, bromide, and iodide) from aqueous solutions by a process of adsorption and/or ion exchange. Goh et al. in Water Res. 2008, 42(6-7), 1343-68, for example, provides an overview of LDH synthesis methods, LDH characterization techniques, and application of LDHs for removal of oxyanions, as generally known in the art up to now.

LDHs are mineral materials having a layered clay-type structure. The structure of LDH materials arises from the structure of brucite, the mineral form of magnesium hydroxide with chemical formula $Mg(OH)_2$, in which divalent metal cations $M^{2+}$ (said metal cations being octahedrally coordinated by hydroxyl groups) are isomorphously substituted by higher valence cations $M^{3+}$ (such as $Al^{3+}$). This substitution is generating positively charged brucite-type layers which are electro-neutralized by anions which, together with crystallization water molecules, are located in the interlayer region.

The structure of a typical octahedral unit and of a LDH are shown in FIG. 1 and FIG. 2, respectively. The basal spacing (c') depicted by reference sign (1) in FIG. 2 is the total thickness of the brucite-like sheet (3) and the interlayer region (2) of the LDH structure. The octahedral units of $M^{2+}$ or $M^{3+}$ (being sixfold coordinated to OH—) share edges to form infinite sheets. These sheets are stacked on top of each other and are held together by hydrogen bonding.

LDHs are represented by the general formula As generally known, LDH materials are endowed with excellent anion exchange abilities for a high number of inorganic anions (e.g. nitrate, sulphate, chromate, etc.) and organic anions (e.g. acetate, tartrate, carboxylate, etc.). Furthermore, LDHs are known in the art to possess thermal stability, having a relative high surface area, being easy and economically viable to produce, and having low toxicity. This versatility of the LDH-type materials has already led to their application in many fields, for example for use as sorbents for (oxy)anions, as catalysts, catalysts precursors or catalytic supports, as nano-fillers for polymeric nanocomposites, as sensors, or in medicine as drug-carriers. However, a main concern in the application of LDHs as sorbent for (oxy) anions in the art is still related to their low stability in alkaline environment.

Accordingly, there is a desire to provide LDHs being stable at high pH (e.g. ranging from 10 to 13) while retaining maximal sorption capacity.

Poernomo Gunawan et al., "Lanthanide-Doped Layered Double Hydroxides Intercalated with Sensitizing Anions: Efficient Energy Transfer between Host and Guest Layers", Journal of Physical Chemistry C, vol. 113, No. 39, pp. 17206-17214 describes a process for the preparation of Terbium (Tb)-doped layered double hydroxides comprising the steps of adding a mixed solution of salts of Mg, Al and Tb drop-wise to an aqueous NaOH-solution, aging and separating the precipitate.

It has been observed by the present inventors that Ln-doped LDH obtained by the above route suffer from decrease of crystallinity with increased degree of Ln-doping.

SUMMARY

An objective of aspects of the present disclosure is to provide at least an alternative route for the preparation of lanthanide-doped layered double hydroxides (LDHs), in particular to provide a preparation route that does not have the above mentioned drawbacks and/or which is more robust and/or which leads to improved lanthanide-doped LDHs. It is an objective of aspects of the present disclosure to produce layered double hydroxide-type anionic clays and to use the produced materials as sorbent.

According to first aspects of the disclosure, there is therefore provided a method for producing lanthanide-doped layered double hydroxides (LDHs) as set out in the appended claims. The method comprises the steps of preparing an alkaline solution, wherein the alkaline solution does not comprise carbonates; preparing a solution of metal salts comprising a salt of a lanthanide; combining the alkaline solution and the solution of metal salts so as to form a mixture and Ln-doped LDH precipitate wherein the pH of the mixture is maintained at a constant value; aging the precipitate; and separating the precipitate from the solution.

Performing the method is free from carbonates. According to the present disclosure, the alkaline solution is an aqueous ammonia solution.

By performing the method of the present disclosure, the doping of the LDH material with lanthanides is performed within the brucite-like sheets (and not by incorporating the lanthanides in the interlayer region between two brucite-like sheets, as it is the case using methods known in the art). Furthermore, the preparation route according to the present disclosure allows for reducing or even completely preventing lanthanide segregation. Alkaline stability is thereby provided to the Ln-doped LDHs obtainable by methods of the present disclosure, allowing the doped LDHs to be directly applied as sorbent for recovering (oxy)anions in high alkaline environment (i.e. having a pH of 10 up to around 13.5).

Further advantageous aspects of the present disclosure are set out in the dependent claims.

According to second aspects of the present disclosure, there is provided lanthanide-doped layered double hydroxides, such as obtainable or obtained by methods according to the present disclosure, as set out in the appended claims. In the lanthanide-doped LDHs, the lattice parameter $a_{110}$ of the unit cell of the crystal structure of the LDH material is advantageously increased with at least 1.6% compared to the lattice parameter $a_{110}$ of the unit cell of the crystal structure of the non-doped LDH material. The increase in $a_{110}$ confirms that the lanthanides are incorporated directly in the lattice layers of the LDH material (and not in the interlayer region between two brucite-like sheets, as it is the case for doped LDHs produced using methods known in the art).

According to yet other aspects of the present disclosure, there is provided the use of lanthanide-doped layered double hydroxides obtainable by a method according to the first aspects, or of lanthanide-doped LDH according to the second aspect, as set out in the appended claims. The use as sorbent, as catalyst, or as fluorescent material is described herein.

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
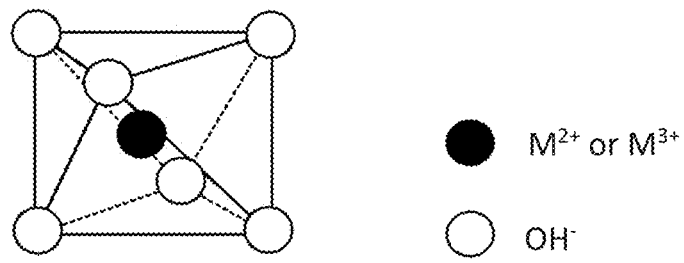
FIG. 1 schematically represents an octahedral unit with $M^{2+}$ or $M^{3+}$ metal cations being octahedrally coordinated by $OH^-$ anions.
Figure 2:
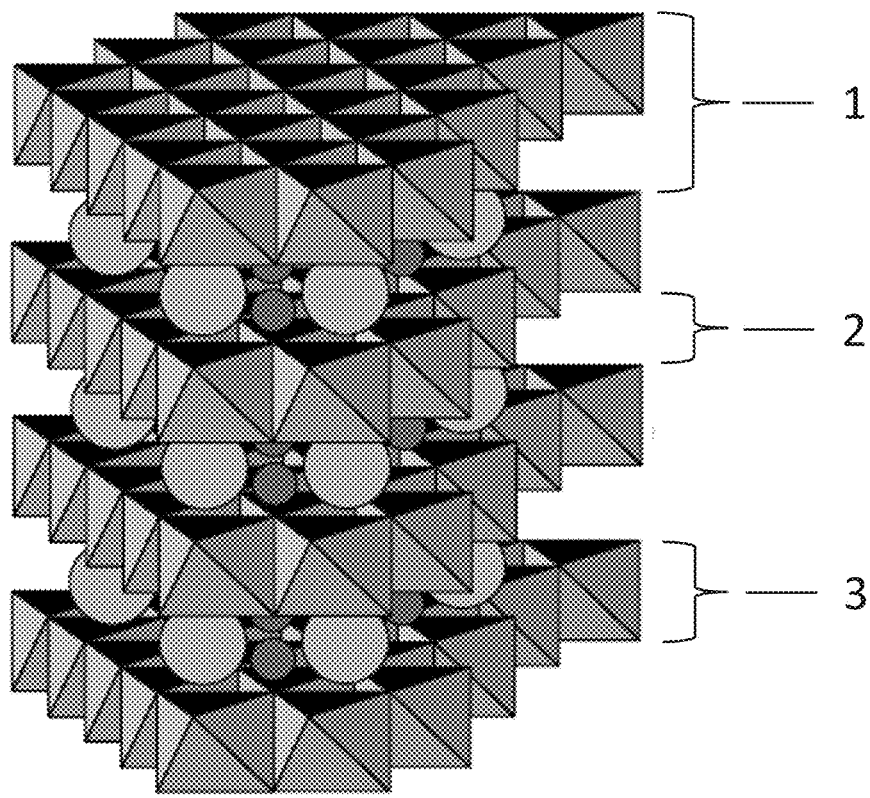
FIG. 2 schematically represents a layered double hydroxide (LDH) structure with (1) the basal spacing (c'), (2) the interlayer region, and (3) the brucite-like sheet.
Figure 2:
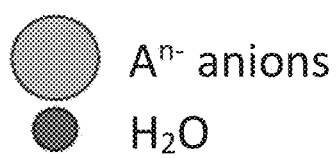

Methods for producing lanthanide doped layered double hydroxides (Ln-doped LDHs) according to aspects of the present disclosure include the steps of:
(a) preparing an alkaline solution (as co-precipitation agent), wherein the alkaline solution does not comprise carbonates;
(b) preparing a (aqueous) solution of metal salts (as precipitation solution) comprising a salt of a lanthanide;
(c) combining the alkaline solution and the solution of metal salts so as to form (by co-precipitation) a mixture of Ln-doped LDH precipitate and solution thereby maintaining the pH of the formed solution at a constant value;
(d) aging the precipitate; and
(e) separating the precipitate from the solution.

The synthesis according to the method of the present disclosure is free from carbonates. More particularly, the co-precipitation in aspects of the present disclosure is performed in alkaline environment in the absence of carbonates (e.g. $Na_2CO_3$) as co-precipitating agent (i.e. the alkaline solution is free from carbonates, or, in other words, the alkaline solution does not comprise carbonates). Moreover, methods in the art for producing Ln-doped LDHs fail to incorporate the $Ln^{3+}$ cations within the brucite-like sheets, a requisite to retain the ion-exchange characteristic and a key in providing the alkaline stability of the doped structure (cf. further below).

Indeed, for example Wang et al. in Chemical Engineering Journal, 2017, 309, 445-453 report the synthesis of MgAl- and CaAl-containing structures comprising $La^{3+}$ metal as dopant, said structures to be used as a coagulation agent for graphene oxide. The synthesis of the structures reported by Wang et al. is performed via co-precipitation of metal nitrate salts in the presence of NaOH and $Na_2CO_3$ mixture which favours the formation of carbonate species in the very early stage of co-precipitation, thus impeding the isomorphous substitution into the lattice. In fact, the reported structure for the MgAlLa material by Wang et al. reveals a material composed of LDH phase combined with a segregated $La_2O_3$ phase (the latter phase being a major phase due to the high La content with respect to Al), thus a composite LDH/$La_2O_3$ rather than a La-doped MgAl structure. Moreover, the reported structure by Wang contains carbonate anions in the interlayer. As will be further demonstrated in the Examples below, the Ln-doped LDH material obtainable by a method of the present disclosure is composed of only a LDH structure in which the $Ln^{3+}$ cations (advantageously the $La^{3+}$ cations) are incorporated or doped (by isomorphous substitution) in the lattice layers (as can be observed from the XRD patterns of FIG. 7 and FIG. 12, and the data in Tables 1A to 1D, cf. examples below). In methods described in the art, on the contrary, La-doped LDHs are only obtained by intercalation of lanthanide anionic complexes in the interlayer region of the LDHs.

According to aspects of the present disclosure, the alkaline solution is an ammonia solution. Advantageously, the concentration of the ammonia solution is comprised between 20 and 30% (w/w) $NH_3$, advantageously the concentration of the solution is 25% (w/w) $NH_3$.

In the context of the present disclosure, an ammonia solution refers to a solution of ammonia in water, denoted by $NH_3(aq)$.

Advantageously, the (aqueous) solution of metal salts comprises (or consists of) a salt of a lanthanide, (a salt of) aluminium and (a salt of) one or more of calcium, magnesium, and zinc.

In the context of the present disclosure, a salt of a lanthanide refers to a salt comprising as cation one of the elements of the lanthanides.

Advantageously, the lanthanide in the solution of metal salts is lanthanum (La) (or, in other words, the solution of metal salts comprises a salt of lanthanum), Europium (Eu), or Terbium (Tb).

Advantageously, the solution of metal salts is free from carbonates, or, in other words, the solution of metal salts does not comprise carbonates.

More advantageously, the solution of metal salts comprises (or consists of) a salt of lanthanum, (a salt of) aluminium and (a salt of) one or more of calcium, magnesium, and zinc.

More advantageously, the solution of metal salts comprises (or consists of) a salt of a lanthanide, (a salt of) aluminium and (a salt of) calcium, magnesium, or zinc. Even more advantageously, the solution of metal salts comprises (or consists of) a salt of lanthanum, (a salt of) aluminium and (a salt of) calcium, magnesium, or zinc.

More advantageously, in the solution of metal salts the molar ratio of Ca/Al/Ln (advantageously Ca/Al/La) is 2 to 4/0.5 to 0.95/0.05 to 0.5, or the molar ratio of Mg/Al/Ln (advantageously Mg/Al/La) is 2 to 4/0.5 to 0.95/0.05 to 0.5, or the molar ratio of Zn/Al/Ln is 2 to 4/0.5 to 0.95/0.05 to 0.5. Advantageously, the molar ratio of Mg/Al/Ln (advantageously Mg/Al/La) is 2 to 4/0.9 to 0.95/0.05 to 0.1. Even more advantageously, in the solution of metal salts the molar ratio of Ca/Al/Ln (advantageously Ca/Al/La) is 2/0.5 to 0.9/0.1 to 0.5, or the molar ratio of Mg/Al/Ln (advantageously Mg/Al/La) is 3/0.9 to 0.95/0.05 to 0.1, or the molar ratio of Zn/Al/Ln (advantageously Zn/Al/La) is 2/0.5 to 0.95/0.05 to 0.5.

Advantageously, the anions present in the (aqueous) solution of metal salts are hydroxide ($OH^-$), and nitrate ($NO^{3-}$), bromide (Br), chloride ($Cl^-$), or fluoride ($F^-$); advantageously the anions present in the solution of metal salts are hydroxide, and nitrate or chloride. In a method of the present disclosure, the anions present in the solution of metal salts form the interlayer anions in the interlayer region between the brucite-like sheets of the Ln-doped LDH material. Advantageously at least 70% of the anions are nitrate, advantageously at least 80%, advantageously at least 90%.

More advantageously, the solution of metal salts comprises (or consists of) $CaCl_2 \cdot 2H_2O$ (calcium chloride dihydrate), $AlCl_3 \cdot 6H_2O$ (aluminium chloride hexahydrate) and $LaCl_3 \cdot 7H_2O$ (lanthanum(III) chloride heptahydrate). Alternatively, the solution of metal salts comprises (or consists of) $Mg(NO_3)_2 \cdot 6H_2O$ (magnesium nitrate hexahydrate), $Al(NO_3)_3 \cdot 9H_2O$ (aluminium nitrate nonahydrate) and $La(NO_3)_3 \cdot 6H_2O$ (lanthanum(III) nitrate hexahydrate). In yet another alternative, the solution of metal salts comprises (or consists of) $Zn(NO_3)_2 \cdot 6H_2O$ (zinc nitrate hexahydrate), $Al(NO_3)_3 \cdot 9H_2O$ (aluminium nitrate nonahydrate) and $La(NO_3)_3 \cdot 6H_2O$ (lanthanum(III) nitrate hexahydrate).

More advantageously, Ln-doped $Ca^{2+}$ containing LDH material (i.e. Ln-doped hydrocalumites) obtainable by a method of the present disclosure comprise chlorides (i.e. the chlorides initially being present in the solution of metal salts) as interlayer anions in the interlayer region between the brucite-like sheets. Alternatively, Ln-doped $Mg^{2+}$ containing LDH material (i.e. Ln-doped hydrotalcites) obtainable by a method of the present disclosure comprise nitrates (i.e. the nitrates initially being present in the solution of metal salts) as interlayer anions in the interlayer region between the brucite-like sheets. The nitrates advantageously form at least 90% of the anions in the interlayer region. In yet another alternative, Ln-doped $Zn^{2+}$ containing LDH material (i.e. Ln-doped zaccagnaite) obtainable by a method of the present disclosure comprise nitrates (i.e. the nitrates initially being present in the solution of metal salts) as interlayer anions in the interlayer region between the brucite-like sheets.

Even more advantageously, the concentration of the solution of metal salts is comprised between 0.5M and 2M, advantageously being 1M.

Even more advantageously, in the solution of metal salts comprising $CaCl_2 \cdot 2H_2O$, $AlCl_3 \cdot 6H_2O$ and $LaCl_3 \cdot 7H_2O$, the mole percent (or molar percentage or molar proportion, mol %) of La is comprised between 1 to 17.5, advantageously between 3.3 to 16.5. Alternatively, in the solution of metal salts comprising $Mg(NO_3)_2 \cdot 6H_2O$, $Al(NO_3)_3 \cdot 9H_2O$ and $La(NO_3)_3 \cdot 6H_2O$, the mole percent of La is comprised between 1 to 17.5, advantageously between 1.65 to 17.5, advantageously between 1.65 to 3.3. In yet another alternative, in the solution of metal salts comprising $Zn(NO_3)_2 \cdot 6H_2O$, $Al(NO_3)_3 \cdot 9H_2O$ and $La(NO_3)_3 \cdot 6H_2O$, the mole percent of La is comprised between 1 to 17.5, advantageously between 1.65 to 17.5.

The metal salts in the precipitation solution (i.e. in the solution of metal salts) are the precursors for forming the precipitate by co-precipitation with the alkaline solution in step (c). More particularly, by combining, in step (c), the alkaline solution and the solution of metal salts, a mixture of Ln-doped LDH precipitate and solution is formed by co-precipitation (more particularly, Ln-doped LDH precipitate (solid phase) in solution is formed). The alkaline solution and the solution of metal salts are combined in such a way that the pH of the solution formed in said step is maintained at a constant value. In this way, the doping of the LDH material with lanthanides, more particularly with $Ln^{3+}$ cations (advantageously with lanthanum, more particularly with $La^{3+}$ cations) is performed by isomorphous substitution of the trivalent metal cations $M^{3+}$, initially being present in the octahedral units in the brucite-like sheets of the LDH material, with (or by) the $Ln^{3+}$ cations (advantageously the $La^{3+}$ cations). In aspects of the present disclosure, the chemical composition of the LDH material is thus tuned by doping with $Ln^{3+}$ cations (advantageously $La^{3+}$ cations) within the brucite-like sheets (and not by incorporating the cations in the interlayer region between two such brucite-like sheets). The doping can be performed in various cationic ratios. This way of doping provides alkaline stability to the Ln-doped LDHs (advantageously La-doped LDHs) produced by methods of the present disclosure, allowing the Ln-doped LDHs to be directly applied as sorbent in harsh conditions, e.g. for the direct use for sorption of valuable metals from industrial complex high alkaline leachate mixtures having a pH of 10 up to around 13.5.

Combining the alkaline solution and the solution of metal salts in step (c) is performed by adding the alkaline solution to the solution of metal salts or by adding the solution of metal salts to the alkaline solution. Advantageously, the alkaline solution is added to the solution of metal salts.

The alkaline solution (or the solution of metal salts) is added in such a way that the pH of the solution formed in said step is maintained at a constant value. More advantageously, the speed of adding the alkaline solution to the solution of metal salts (or the solution of metal salts to the alkaline solution) is set so as to maintain the pH of the solution formed in said step constant (i.e. at a constant value). The adding can be performed dropwise. Advantageously, the speed of adding is 5 to 10 mL/min per liter solution of metal salts (or 5 to 10 mL/min per liter of alkaline solution when adding the solution of metal salts to the alkaline solution).

Advantageously, the pH of the formed solution in the co-precipitation step is comprised between 9 and 13, advantageously between 10 and 12, advantageously between 10 and 11.

More advantageously, in the co-precipitation step, the speed of adding the alkaline solution to the solution of metal salts (or the solution of metal salts to the alkaline solution) is 5 to 10 mL/min per liter solution of metal salts (or per liter of alkaline solution) so as to maintain the pH of the formed solution (by co-precipitation) at a constant value comprised between 9 and 13, advantageously between 10 and 12, advantageously between 10 and 11.

Advantageously, the co-precipitation step is performed at a temperature up to 65° C., advantageously up to 50° C., advantageously up to 40° C., advantageously up to 30° C. The co-precipitation step is advantageously performed at a temperature comprised between 1° C. and 65° C.; advantageously between room temperature and 65° C., or alternatively between 1° C. and 50° C., advantageously between 1° C. and 40° C., advantageously between 1° C. and 30° C., advantageously between 1° C. and room temperature (20° C.).

Methods of the present disclosure are performed in the absence of carbonates (e.g. $Na_2CO_3$). More particularly, in methods of the present disclosure, the co-precipitation is performed in alkaline environment (i.e. by an alkaline co-precipitation) in the absence of carbonates. According to the present disclosure the co-precipitation is performed in ammonia solution.

After performing the co-precipitation step, the formed precipitate is aged. More particularly, during the aging step, the precipitate and solution formed in step (c) are kept in contact with each other for a period of time. Advantageously, the step of aging the precipitate (step (d)) is performed for a period of at least 1 hour, advantageously for a period between 1 hour and 24 hours, advantageously from 6 hours to 24 hours. The step d) of aging the precipitate is advantageously performed at a temperature comprised between 10° C. and 150° C., advantageously between 10° C. and 65° C. Alternatively, the step d) of aging the precipitate is advantageously performed at a temperature up to 65° C. (e.g. between 1° C. and 65° C.), advantageously up to 50° C., advantageously up to 40° C.

Advantageously, step (d) is performed at a temperature being comprised between 10° C. and 65° C., advantageously between room temperature and 65° C., advantageously at 65° C., advantageously for a period of 1 hour to 24 hours. Alternatively, step (d) is performed by hydrothermal treatment at a temperature being comprised between 80° C. and 150° C., advantageously at 110° C., such as for a period of 1 hour to 24 hours. Advantageously, the hydrothermal treatment is performed in an autoclave.

After performing the aging step, the Ln-doped LDH precipitate is separated from the solution. Advantageously, the precipitate comprising (or consisting of) Ln-doped LDH material is separated from the solution by filtration or centrifugation.

Advantageously, after the separation step, the precipitate is washed (one or more times, with distilled water), and optionally dried to obtain a powdered Ln-doped LDH material. The (optional) drying of the precipitate can be performed at a temperature comprised between 10° C. and 150° C., advantageously between room temperature and 80° C., for 1 to 48 hours. More advantageously, the drying of the precipitate is performed between room temperature and 60° C., for 6 to 24 hours.

Advantageously, methods according to the present disclosure can comprise one or a combination of the following aspects:
- the alkaline solution comprises a 25% (w/w) ammonia solution;
- the solution of metal salts consists of a 1M solution of $Mg(NO_3)_2 \cdot 6H_2O$ (magnesium nitrate hexahydrate), $Al(NO_3)_3 \cdot 9H_2O$ (aluminium nitrate nonahydrate) and $La(NO_3)_3 \cdot 6H_2O$ (lanthanum(III) nitrate hexahydrate), the molar ratio of Mg/Al/La being 3/0.9 to 0.95/0.05 to 0.1;
- step (c) is performed at room temperature at a pH comprised between 10 and 12;
- step (d) is performed, e.g. for a period of 1 hour to 24 hours, at a temperature being comprised between 10° C. and 150° C. (advantageously at 65° C. for about 24 hours).

Advantageously, after step (d) (the step of aging), the precipitate comprising (or consisting of) La-doped LDH material is separated from the solution by filtration or centrifugation. After the separation step, the precipitate is washed (one or more times, with distilled water) and optionally dried to obtain a powdered La-doped LDH material. The drying of the precipitate can be performed at 60° C., for 24 hours.

Advantageously, by performing a method of the present disclosure, the lattice parameter $a_{110}$ of the unit cell of the crystal structure of the formed (powdered) Ln-doped LDH material (advantageously La-doped LDH material) is increased with at least 1.6% compared to the lattice parameter $a_{110}$ of the unit cell of the crystal structure of the non-Ln doped powdered LDH material (i.e. of a same LDH material which is not Ln-doped). The increased lattice parameter $a_{110}$ confirms that the lanthanide cations ($Ln^{3+}$) (advantageously lanthanum cations, $La^{3+}$) are indeed incorporated in the lattice layers of the LDH material.

According to other aspects, the present disclosure is related to the use of lanthanide doped layered double hydroxides, advantageously lanthanum, europium or terbium doped layered double hydroxides, obtainable by a method according to the present disclosure, as sorbent (or absorbent) or as catalyst. Advantageously, the Ln-doped LDHs (advantageously La-doped LDHs) are used as sorbent for anions, such as organic anions or inorganic anions, in particular heavy metal anions, advantageously as sorbent for heavy metal oxyanions.

In the context of the present application, the term oxyanion refers to an ion with generic formula $A_xO_y^{z-}$, where A represents a chemical element and O represents an oxygen atom. Examples of oxyanions are arsenite, arsenate, chromate, phosphate, selenite, selenate, vanadate, molibdate, manganate, borate, nitrate, etc.

The term (heavy) metal oxyanion refers to an ion with generic formula $A_xO_y^{z-}$, where the element A represents a (heavy) metal chemical element and O represents an oxygen atom.

The Ln-doped LDHs (advantageously La-doped LDHs) obtainable by a method according to the present disclosure can for example be used as sorbent in wastewater treatment (the wastewater comprising heavy metals, e.g. wastewater from hydrometallurgical processes) or in treatment of alkaline leachates containing metal oxyanions. Alternatively, the Ln-doped LDHs (or calcined forms thereof, advantageously La-doped LDHs or calcined forms thereof) can be used as catalyst in reactions in high pH environment such as photocatalysis, or as basic catalysts in for example aldol condensation reactions. The Ln-doped LDHs (advantageously La-doped LDHs) can be used as well in the treatment of waste of toxic effluents generated in the electroplating industries, coal burning industries, refining, insecticides, fungicides, and in iron and steel producing industries.

Advantageously, the Ln-doped LDHs (advantageously La-doped LDHs) obtainable by a method according to the present disclosure are eco-friendly (non-toxic).

The Ln-doped LDHs (advantageously La-doped LDHs) obtainable by a method according to the present disclosure can directly be applied in high alkaline streams, with no need of prior reduction of pH.

Advantageously, the Ln-doped LDHs (advantageously La-doped LDHs) obtainable by a method according to the present disclosure are used as sorbent at a pH comprised between 7 and 14, advantageously between 8 and 13, advantageously between 10 and 12, advantageously between 11 and 12 (for example at pH of 11.5).

In further aspects, the present disclosure is related to lanthanide doped layered double hydroxides (Ln-doped LDH) obtainable by a method according to the present disclosure. More particularly, the present disclosure is related to lanthanide-doped layered double hydroxides (in particular La-doped LDH) obtainable by a method according to the present disclosure, wherein the lattice parameter $a_{110}$ of the unit cell of the crystal structure of the LDH material is increased with at least 1.6% compared to the lattice parameter $a_{110}$ of the unit cell of the crystal structure of the non-La doped LDH material (i.e. of a same LDH material which is not La-doped). The increased lattice parameter $a_{110}$ confirms that lanthanum (more particularly $La^{3+}$ cations) is (are) indeed incorporated in the lattice layers of the LDH material.

The Ln-doped LDH obtainable by a method according to the present disclosure can be used as sorbent (advantageously as sorbent for heavy metal anions, more advantageously as sorbent for heavy metal oxyanions), or the Ln-doped LDHs (or calcined forms thereof) can be used as catalyst. More particularly, the Ln-doped LDH can be used as sorbent in a high alkaline environment, i.e. at a pH comprised between 7 and 14, advantageously between 8 and 13, advantageously between 10 and 12, advantageously between 11 and 12 (for example at pH of 11.5).

Advantageously, the Ln-doped LDHs obtainable by a method according to the present disclosure are eco-friendly (non-toxic).

EXAMPLES

The present disclosure is further illustrated by means of the following examples in which two types of layered double hydroxides (LDHs) have been considered. A first LDH type is the $Ca^{2+}$ containing layered material, i.e. the group of hydrocalumites (throughout the present description referred to as HC) in which the divalent calcium ions are hepta-coordinated. The layers consist of a combination of calcium hydroxide decahedra- and hexa-coordinated trivalent hydroxide octahedras (as for example described by Grover et al. in Applied Clay Science 2010, 48(4), 631-637 and by Tian et al. in Journal of Chemistry 2014, 2014, 8). Hydrocalumite has the general formula $Ca_2Al(OH)_6Cl \cdot 2H_2O$ with hepta-coordinated $Ca^{2+}$ and hexa-coordinated $Al^{3+}$ units, respectively.

A second LDH type is the $Mg^{2+}$ containing layered materials, i.e. the group of hydrotalcites (throughout the present description referred to as HT) in which the divalent magnesium ions are hexa-coordinated (as for example described by Cavani et al. in Catalysis Today 1991, 11(2), 173-301). The layers consist of a combination of magnesium and aluminium ions both hexa-coordinated in octahedras. Hydrotalcite-type material has the general formula $Mg_6Al_2CO_3(OH)_{16} \cdot 4(H_2O)$.

Within the context of the present disclosure Hydrotalcite-type materials comprise metal ions like Mg, Al and/or Zn, but also others like Ni, Fe, Cu, Co . . . , in which the metals are hexacoordinated in the brucite-like sheets and include divalent metals hexacoordinated in the LDH sheets (such as Mg2+, Zn2+, Ni2+, Fe2+, Cu2+, etc. . . . ); trivalent metals hexacoordinated in the LDH sheets (such as Al3+, Fe3+, Mn3+, etc. . . . ) or combinations of di- and trivalent metal cations are also possible: multicomponent LDHs—example MgZnAlLn, MgCuAlLn, MgZnFeLn . . . or even containing tetravalent cations Me4+: Sn4+ or Ti4+ (key cations for catalytic applications), example: MgAlSnLn, or MgAlTiLn, etc. . . . .

Advantageously, the lanthanide-doped HT-type LDH's comprise combinations of di- and trivalent metal cations wherein the metal-cations are hexacoordinated in the LDH sheets with cationic ratios in the range of Me2+/Me3+/Ln3+: 2-4/0.8-0.95/0.05-0.2; in particular Me2+/Me3+/Ln3+: 4-5/0.95/0.05. In addition, or alternatively, the lanthanide-doped HT-type LDH's comprise tetravalent metal cations with cationic ratios in the range of Me2+/(Me3++ Me4+)/Ln3+: 2-4/0.8-0.95/0.05-0.2.

In Example 1, the isomorphous substitution of $Al^{3+}$ with $Ln^{3+}$ cations in MgAl-hydrotalcite is compared with a comparative substitution in CaAl-hydrocalumites.

Furthermore, in Example 2, the adsorption of (oxy)anions by non-doped and doped LDH-type materials is studied. Indeed, LDH-type materials can adsorb (oxy)anions (such as inorganic anions (e.g. nitrate, sulphate, chromate, etc.), and/or organic anions (e.g. acetate, tartrate, carboxylate, etc.)) via an anionic exchange mechanism where the interlayer anions between two sheets (i.e. the interlayer anions in the interlayer region between two neighbouring brucite-like sheets) are replaced by new anions (e.g. by (oxy)anions present in the treated wastewater). Sorption performance of the materials is thereby known to be influenced by the type of material and the type of intercalated anion. This phenomenon is controlled by the anionic affinity for LDHs which is well known in the art (as for example described by Goh et al. in Water Res. 2008, 42(6-7), 1343-1368; or by Xu et al. in Handbook of Layered Materials, S. M. Auerbach, K. A. Carrado, P. K. Dutta (Eds.), Marcel Dekker Inc., 2004, p. 373), to be in the following order:

$NO_3^-<Br^-<Cl^-<F^-<OH^-<SO_4^{2-}<CrO_4^{2-}<HAsO_4^{2-}<HPO_4^{2-}<CO_3^{2-}$ with preferential affinity for the anions with higher valence rather than for monovalent state. From this order, it can for example be derived that nitrate anions ($NO_3^-$) can easily be exchanged with chromate anions ($CrO_4^{2-}$).

Example 1: Isomorphous Substitution of $Al^{3+}$ by $La^{3+}$ in CaAl-HC Versus in MgAl-HT In this example, La-doped HC- is synthesised using a comparative method and HT-type material is synthesised using a method of the present disclosure. The crystalline structure of the obtained LDH material is then investigated via X-ray diffraction analysis (XRD). Furthermore, images of the morphology of the LDH material are produced using a scanning electron microscope (SEM). The obtained results are additionally compared to the characteristics of the HC- and HT-type material obtained by performing the same method except for performing the step of doping with La.

1.A. Comparative Example: Non-La Doped HC-Type Material

Non-La doped HC-type material is synthesised by slowly adding (by dropwise adding, with speed of 4.16 mL/min for 120 minutes) basic sodium hydroxide solution (NaOH 2M) as co-precipitation agent to 500 mL of a mixed solution (1M in total) of metal precursor salts. The sodium hydroxide solution does not comprise carbonates (e.g. $Na_2CO_3$). The solution of metal salts contains $CaCl_2 \cdot 2H_2O$ and $AlCl_3 \cdot 6H_2O$, and does not comprise a metal salt of a lanthanide (hence, does not comprise a metal salt of lanthanum either). Furthermore, the solution of metal salts does not comprise carbonates either. The solution of metal salts is stirred to obtain the mixed (or stirred) solution, before performing the step of adding the sodium hydroxide solution to the solution of metal salts. By then slowly adding the sodium hydroxide solution to the (mixed) solution of metal salts, non-Ln doped, more particularly non-La doped, LDH precipitate in solution is formed by co-precipitation at room temperature while the pH of the solution is maintained at a constant value of 11.5. The formed precipitate is then aged at 65° C. for 24 h, separated by filtration, washed with distilled water and dried at 60° C. for 24 hours to obtain powdered non-La doped LDH material. More particularly, non-La doped hydrocalumite-type Ca2Al material is obtained with $Cl^-$ as interlayer anions.

Table 1A reports the synthesis conditions and structural characteristics of the formed non-La doped hydrocalumite-type Ca2Al material (with cationic ratio Ca/Al being 2/1).

TABLE 1A

| non-La doped Ca2Al HC-type structure | | | | |
|---|---|---|---|---|
| cationic ratio Ca/Al | La (mol %) | Co-precipitation agent | pH | aging T | unit cell parameters of LDH phase |
| 2 to 4/1 | 0 | NaOH 2M | 11.5-12 | 65° C. | $2\theta = 11.302°-11.34°$ $d_{002} = 7.823-7.790$ Å $c_{002} = 15.645-15.593$ Å $2\theta = 31.14°$ $d_{110} = 2.872$ Å $a_{110} = 5.745$ Å |

Figure 3:
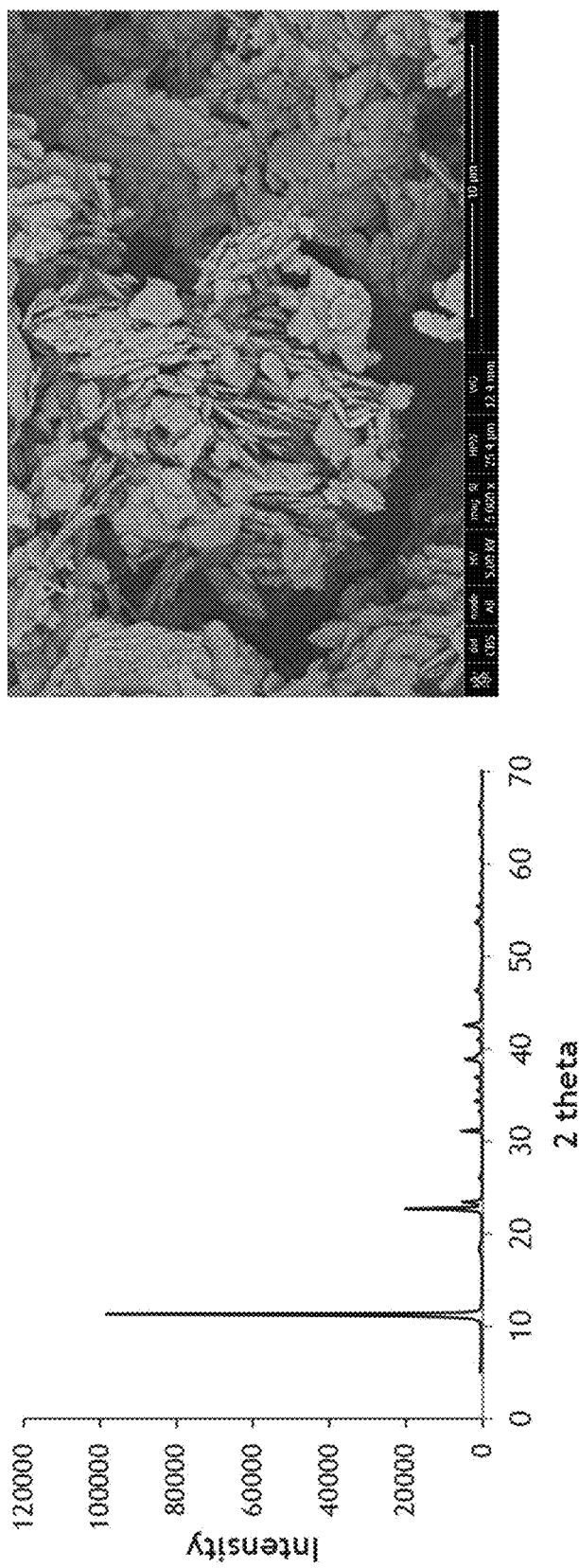
FIG. 3 depicts a XRD pattern (left) and SEM image (right) of Ca2Al hydrocalumite-type structure obtained in Example 1.A (non-La doped HC-type material)

The structure and morphology of the Ca2Al material is confirmed by XRD and SEM, respectively, as can be seen from FIG. 3 showing the XRD pattern (left) and SEM image (right) of the obtained non-La doped Ca2Al HC-type structure. The unit cell parameters of the LDH phase are given in Table 1A.

Figure 4:
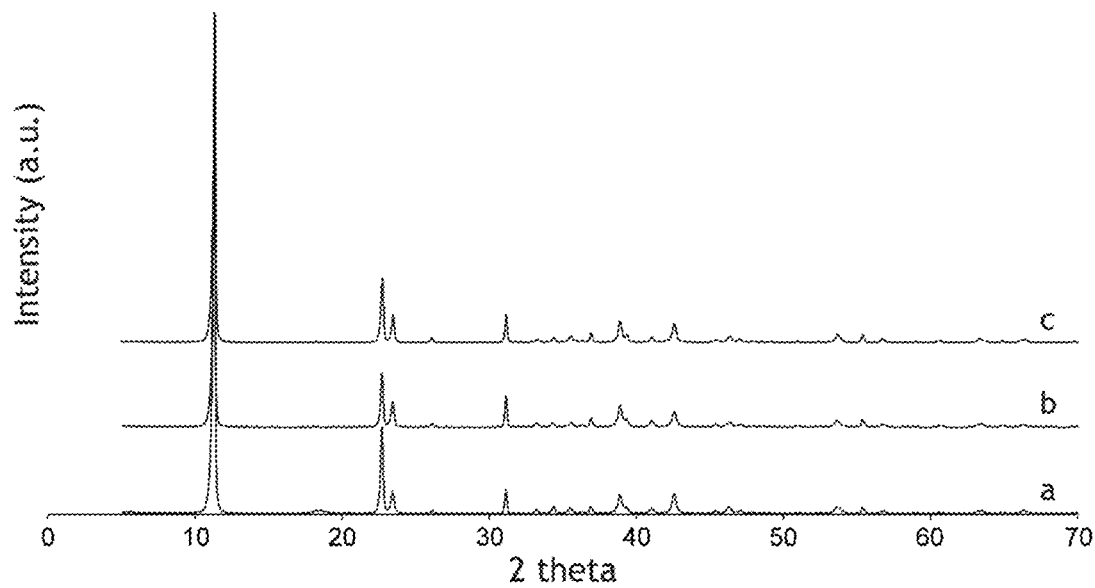
FIG. 4 depicts XRD patterns of (a) Ca2Al, (b) Ca3Al and (c) Ca4Al hydrocalumite-type materials obtained in Example 1.A (non-La doped HC-type material)

Moreover, by increasing the calcium content (cationic ratio Ca/Al being 3/1 and 4/1), Ca3Al-LDH and Ca4Al-LDH are successfully synthesised as well, the structure of which is confirmed by XRD as can be seen from FIG. 4 showing the XRD patterns of the obtained non-La doped HC-type materials (a) Ca2Al, (b) Ca3Al and (c) Ca4Al.

1.B. Comparative Example: La-Doped HC-Type Material

La-doped HC-type material is synthesised by by slowly adding (by dropwise adding, with speed of 4.16 mL/min for 120 minutes) basic sodium hydroxide solution (NaOH 2M) as co-precipitation agent to 500 mL of a mixed solution (1M in total) of metal precursor salts. The sodium hydroxide solution does not comprise carbonates (e.g. $Na_2CO_3$). In the present example, the solution of metal salts contains $CaCl_2 \cdot 2H_2O$, $AlCl_3 \cdot 6H_2O$, and $LaCl_3 \cdot 7H_2O$. The solution of metal salts does not comprise carbonates either. The solution of metal salts is stirred to obtain the mixed (or stirred) solution, before performing the step of adding the sodium hydroxide solution to the solution of metal salts. By then slowly adding the sodium hydroxide solution to the (mixed) solution of metal salts, La-doped LDH precipitate in solution is formed by co-precipitation at room temperature while the pH of the solution is maintained at a constant value of 11.5. The formed precipitate is then aged at 65° C. for 24 h, separated by filtration, washed with distilled water and dried at 60° C. for 24 hours to obtain powdered La-doped LDH material. More particularly, La-doped hydrocalumite-type CaAlLa material is obtained with $Cl^-$ as interlayer anions.

Table 1B reports the synthesis conditions and structural characteristics of the formed La-doped hydrocalumite-type CaAlLa material.

TABLE 1B

La-doped CaAlLa HC-type structure

| cationic ratio Ca/Al/La | La (mol %) | Co-precipitation agent | pH | aging T | unit cell parameters of LDH phase |
|---|---|---|---|---|---|
| 2/0.5 to 0.9/ 0.1 to 0.5 | 3.3 to 16.5 | NaOH 2M | 11.5-12 | 65° C. | $2\theta = 11.325°\text{-}11.345°$ $d_{002} = 7.85\text{-}7.82$ Å $c_{002} = 15.71\text{-}15.64$ Å $2\theta = 31.14\text{-}31.15°$ $d_{110} = 2.86\text{-}2.875$ Å $a_{110} = 5.73\text{-}5.75$ Å |

The structure of the LDH material is confirmed by XRD, the unit cell parameters of the LDH phase given in Table 1B.

Figure 5:
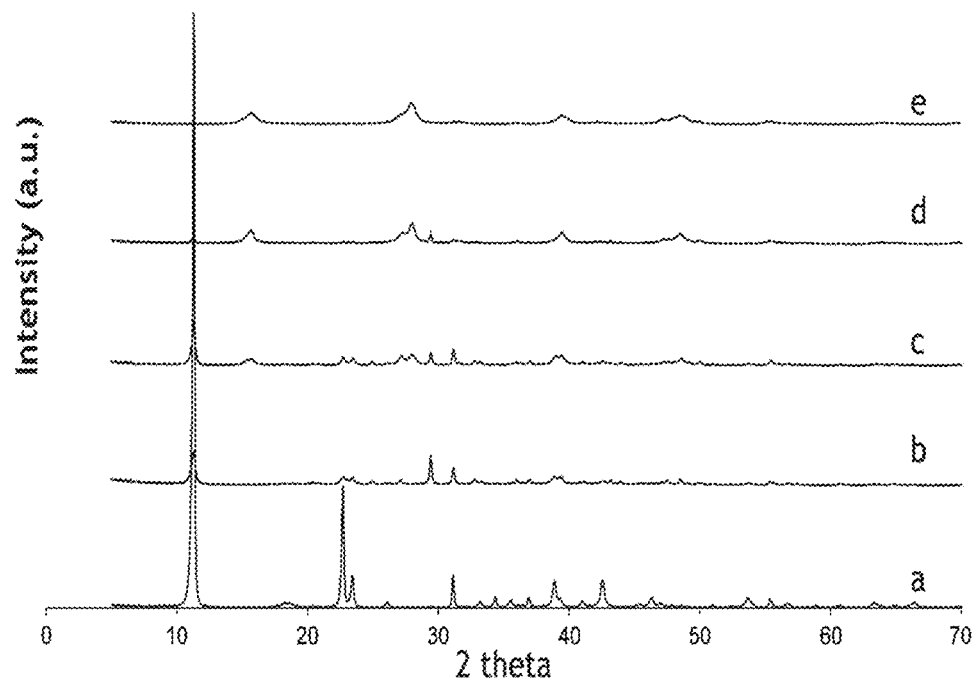
FIG. 5 depicts XRD patterns of (a) Ca2Al; (b) Ca2Al0.9La0.1 (3.3 m % La), (c) Ca2Al0.8La0.2 (6.6 m % La), (d) Ca2Al0.5La0.5 (16.5 m % La) and (e) La(OH)$_3$ reference material (Example 1.B, La-doped HC-type material)

FIG. 5 shows the obtained XRD patterns of (a) Ca2Al (non-La doped); (b) Ca2Al0.9La0.1 (3.3 m % La), (c) Ca2Al0.8La0.2 (6.6 m % La), (d) Ca2Al0.5La0.5 (16.5 m % La) and (e) La(OH)$_3$ reference material.

The XRD characterization indicates the formation of a partial segregation phase of La(OH)$_3$ or La$_2$O$_3$ with increase of substitution degree. In other words, the crystallinity of the LDH material decreases with increased degree of La$^{3+}$ doping.

Figure 6:
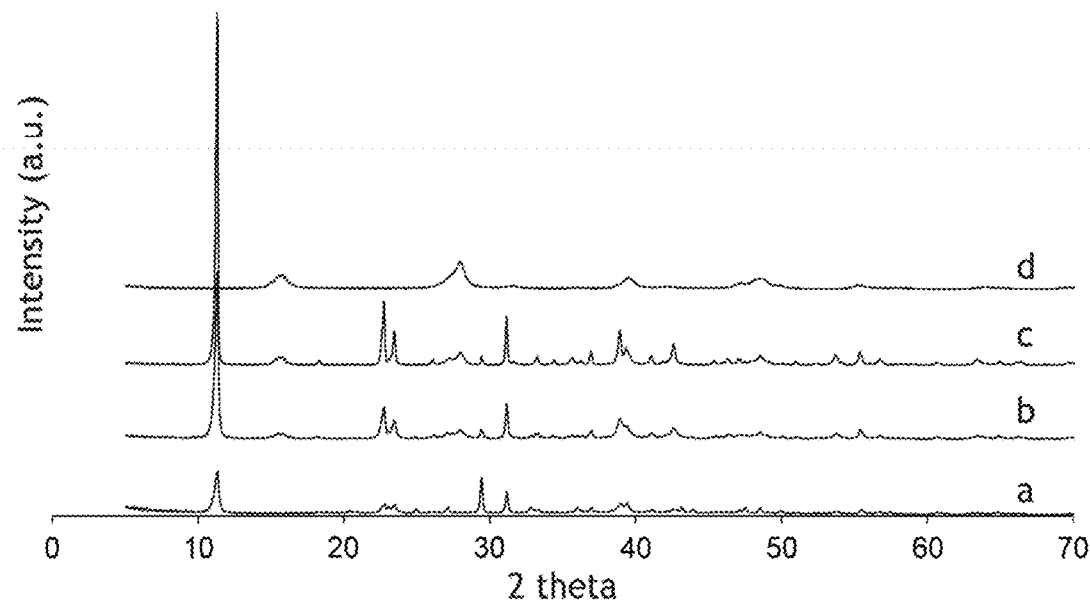
FIG. 6 depicts XRD patterns of Ca2Al0.9La0.1 (3.3 m % La) aged (a) at RT, (b) at 65° C., (c) at 110° C. and (d) La(OH)$_3$ reference material (Example 1.B, La-doped HC-type material)

The Ca2Al0.9La0.1 sample with 3.3 m % La-doping shows the lowest degree of segregated La-phases (La(OH)$_3$ or La$_2$O$_3$) but also has a low crystallization degree of the LDH phase. A further optimization of the crystallization degree of the Ca2Al0.9La0.1 (3.3 m % La) LDH phase is performed by optimizing the synthesis conditions, i.e. by performing the co-precipitation at RT followed by aging (a) at RT, (b) at 65° C., (c) via hydrothermal treatment in an autoclave at 110° C. and (d) La(OH)$_3$ reference material, as shown in FIG. 6.

Furthermore, from Table 1A (non-La doped CaAl HC-type structure) and Table 1B (La-doped CaAlLa HC-type structure), i.e. comparing the non-doped HC-type structure with the doped HC-type structure, it can be seen that the unit cell parameter $a_{110}$ increases with the amount of La$^{3+}$ content. This confirms that La$^{3+}$ is indeed incorporated in the lattice layers of the HC-type structure of Example 1.B.

1.C. Comparative Example: Non-La Doped HT-Type Material

Non-La doped HT-type material is synthesised by slowly adding (by dropwise adding, with speed of 4.16 mL/min for 120 minutes) basic ammonia solution (25 wt % NH$_3$) as co-precipitation agent to 500 mL of a mixed solution (1M in total) of metal precursor salts. The ammonia solution does not comprise carbonates (e.g. Na$_2$CO$_3$). The solution of metal salts contains Mg(NO$_3$)$_2$·6H$_2$O and Al(NO$_3$)$_3$·9H$_2$O, and does not comprise a metal salt of a lanthanide (hence, does not comprise a metal salt of lanthanum either). Furthermore, the solution of metal salts does not comprise carbonates either. The solution of metal salts is stirred to obtain the mixed (or stirred) solution, before performing the step of adding the ammonia solution to the solution of metal salts. By then slowly adding the ammonia solution to the (mixed) solution of metal salts, non-Ln doped, more particularly non-La doped, LDH precipitate in solution is formed by co-precipitation at room temperature while the pH of the solution is maintained at a constant value of 10. The formed precipitate is then aged at 65° C. for 24 h, separated by filtration, washed with distilled water and dried at 60° C. for 24 hours to obtain powdered non-La doped LDH material. More particularly, non-La doped hydrotalcite-type MgAl material is obtained with NO$_3^-$ as interlayer anions.

Table 1C reports the synthesis conditions and structural characteristics of the formed non-La doped hydrotalcite-type MgAl material.

TABLE 1C non-La doped MgAl HT-type structure

| cationic ratio Mg/Al | La (mol %) | co-precipitation agent | pH | aging T | unit cell parameters of LDH phase |
|---|---|---|---|---|---|
| 3/1 | 0 | ammonia solution (25% (w/w) NH$_3$) | 10 | 65° C. | $2\theta = 9.98°$ $d_{003} = 8.856$ Å $c_{003} = 26.568$ Å $2\theta = 60.98°$ $d_{110} = 1.5482$ Å $a_{110} = 3.032$ Å |

Figure 7:
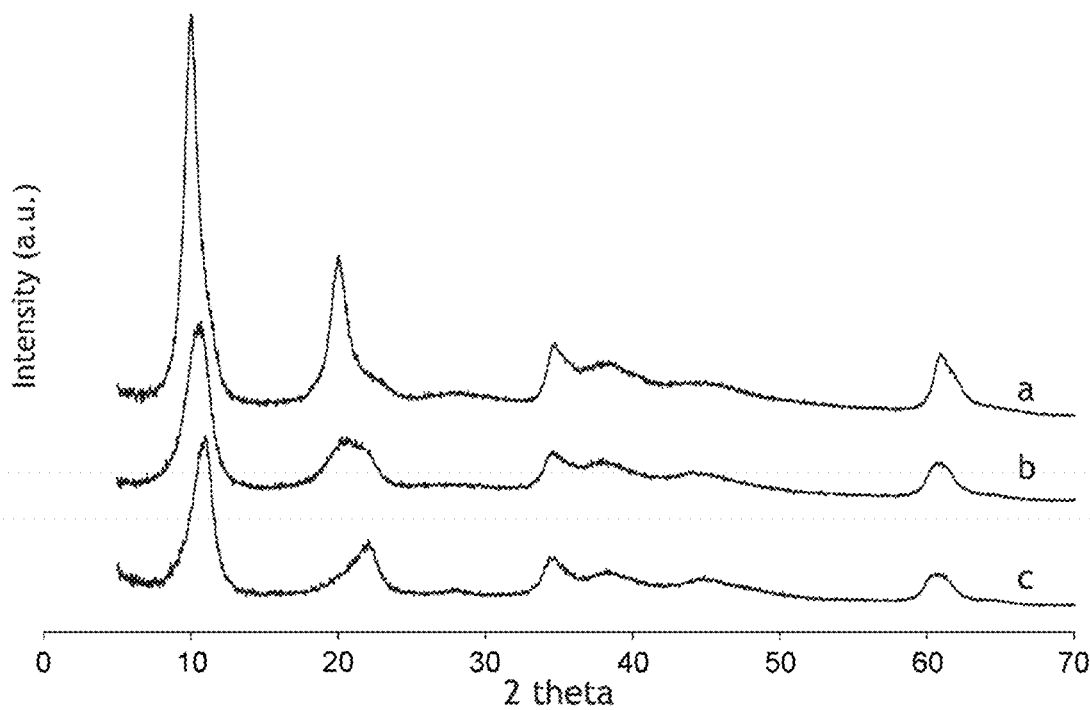
FIG. 7 depicts XRD patterns of (a) Mg3Al (Example 1.C, non-La doped HT-type material); (b) Mg3Al0.95La0.05 (1.65 m % La) and (c) Mg3Al0.9La0.1 (3.3 m % La) (Example 1.D, La-doped HT-type material)

The structure of the LDH material is confirmed by XRD. FIG. 7 shows the XRD pattern of the obtained Mg3Al LDH phase (curve (a), non-La doped HT-type material). The unit cell parameters of the LDH phase given in Table 1C.

1.D. Example: La-Doped HT-Type Material

La-doped HT-type material is synthesised by slowly adding (by dropwise adding, with speed of 4.16 mL/min for 120 minutes) basic ammonia solution (25 wt % NH$_3$) as co-precipitation agent to 500 mL of a mixed solution (1M in total) of metal precursor salts. In the present example, an ammonia solution is used, instead of NaOH, as co-precipitating agent. The ammonia solution does not comprise carbonates (e.g. Na$_2$CO$_3$). The solution of metal salts contains Mg(NO$_3$)$_2$·6H$_2$O, Al(NO$_3$)$_3$·9H$_2$O and La(NO$_3$)$_3$·6H$_2$O. The solution of metal salts does not comprise carbonates either. The solution of metal salts is stirred to obtain the mixed (or stirred) solution, before performing the step of adding the ammonia solution to the solution of metal salts. By then slowly adding the ammonia solution to the (mixed) solution of metal salts, Ln-doped, more particularly La-doped, LDH precipitate in solution is formed by co-precipitation at room temperature while the pH of the solution is maintained at a constant value of 10. The formed precipitate is then aged at 65° C. for 24 h, separated by filtration, washed with distilled water and dried at 60° C. for 24 hours to obtain powdered La-doped LDH material. More particularly, La-doped hydrotalcite-type MgAlLa material is obtained with NO$_3^-$ as interlayer anions.

Table 1D reports the synthesis conditions and structural characteristics of the formed La-doped hydrotalcite-type MgAlLa material.

TABLE 1D

La-doped MgAlLa HT-type structure

| cationic ratio Mg/Al/La | La (mol %) | co-precipitation agent | pH | aging T | unit cell parameters |
|---|---|---|---|---|---|
| 3/0.9 to 0.95/ | 1.65 to 3.3 | ammonia solution | 11.5-12 | 65° C. | $2\theta = 10.7°\text{-}10.9°$ |

TABLE 1D-continued

La-doped MgAlLa HT-type structure

| cationic ratio Mg/Al/La | La (mol %) | co-precip- itation agent | pH | aging T | unit cell parameters |
|---|---|---|---|---|---|
| 0.05 to 0.1 | | (25% (w/w) NH$_3$) | | | $d_{003}$ = 8.1103- 8.3236 Å $c_{003}$ = 24.33- 24.97 Å $2\theta$ = 60.05- 60.31° $d_{110}$ = 1.523- 1.525 Å $a_{110}$ = 3.067- 3.08 Å |

The structure of the LDH material is confirmed by XRD. FIG. 7 shows the XRD patterns of (a) non-La doped Mg3Al of Example 1.C; and of (b) Mg3Al0.95La0.05 (1.65 m % La) and (c) Mg3Al0.9La0.1 (3.3 m % La) (La-doped HT-type material of the present Example 1.D). The unit cell parameters of the LDH phase given in Table 1 D.

The XRD characterization in FIG. 7 indicates the synthesis of La-substituted Mg3Al-LDH without La$^{3+}$ segregation for both 1.65 m % and 3.3 m % La$^{3+}$ content. The ammonia co-precipitation hence favours the doping of the structure with lanthanum (via isomorphous substitution) in the brucite-like layers when compared with the co-precipitation performed in NaOH (cf. Example 1.B, forming La-doped HC-type material). In other words, the co-precipitation is performed in ammonia solution, thereby forming La-doped HT-type material. More advantageously, La-doped HT-type material is formed with an interlayer of nitrate anions.

Furthermore, from Table 1C (non-La doped MgAl HT-type structure) and Table 1D (La-doped MgAlLa HT-type structure), i.e. comparing the non-doped HT-type structure with the doped HT-type structure, it can be seen that the unit cell parameter $a_{110}$ increases with the amount of La content. This confirms that La$^{3+}$ is indeed incorporated in the lattice layers of the HT-type structure of Example 1.D using a method of the present disclosure (the Shannon ionic radius of La (1.03 Å) being higher than the ionic radius of Al (0.54 Å) and of Mg (0.74 Å)). The doping of the structure with lanthanum is thereby performed (via isomorphous substitution) in the brucite-like layers (and not in the interlayer region between two neighbouring brucite-like sheets).

Example 2: Sorption Performance

In this example, the adsorption of (oxy)anions by LDH-type materials is studied. More particularly, the sorption capacity is measured for non-La doped and La-doped hydrotalcite-type materials.

In the present example, the chromate uptake by non-La doped and La-doped hydrotalcite-type materials from solutions with pH from 8 up to 13 has been tested. The tested LDH materials have different intercalated anions: $NO_3^-$, $CO_3^{2-}$, and $Cl^-$. The results are compared with PURAL® MG 63 HT, a commercial available hydrotalcite material provided by Sasol Performance Chemicals.

Figure 8:
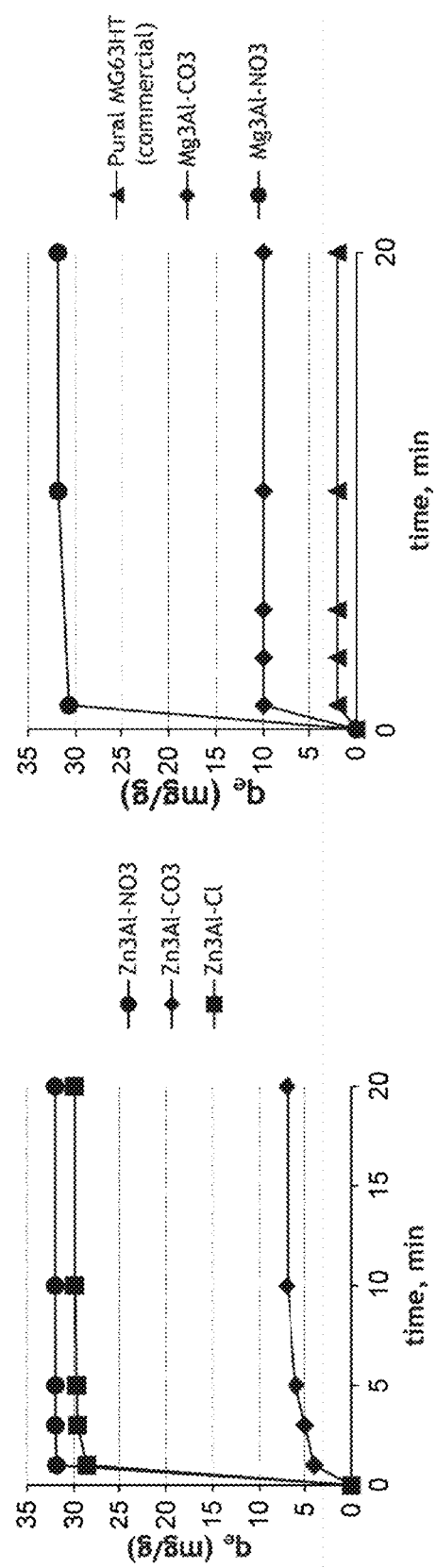
FIG. 8 shows the adsorbed chromate amounts ($q_e$, mgCr$^{6+}$/g) at pH 8 as a function of time for conventional non-La doped hydrotalcite-type (LDH) materials having different intercalated anions: ZnAl-type (left) and MgAl-type (right), compared with PURAL® MG 63 HT.

FIG. 8 shows the adsorbed chromate amounts (adsorption capacity at equilibrium $q_e$, in mgCr$^{6+}$/g) at pH 8 as a function of time for conventional non-La doped hydrotalcite-type (LDH) materials having different intercalated (i.e. the exchangeable) anions: ZnAl-type (left) and MgAl-type (right), compared with PURAL® MG 63 HT.

Figure 9:
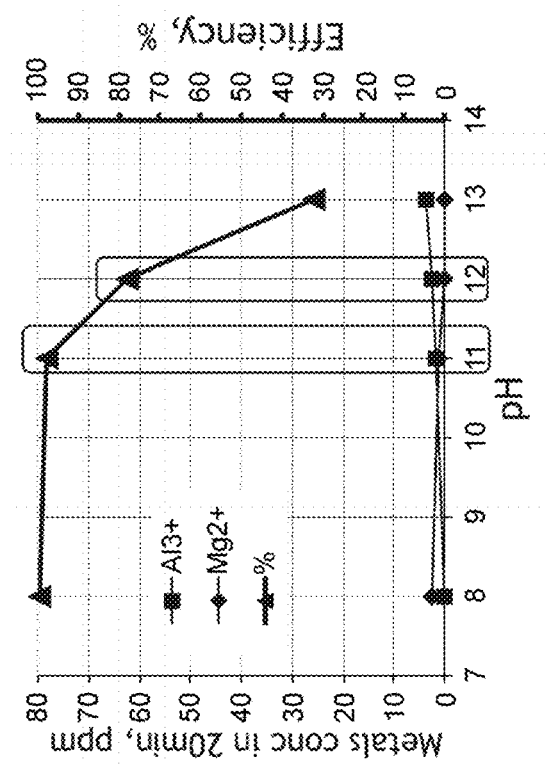
FIG. 9 shows the sorption efficiency of chromate and material stability during sorption tests at different pH for ZnAl-type (left) and MgAl-type (right) conventional hydrotalcites.
Figure 9:
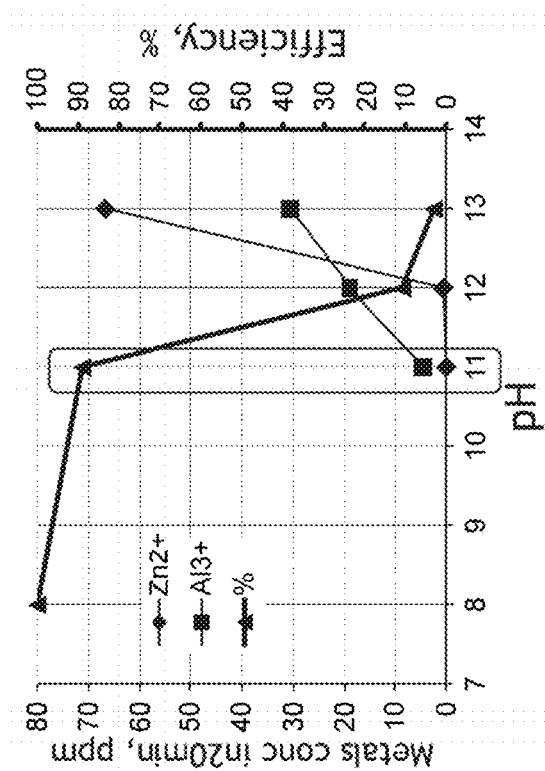
Figure 10:
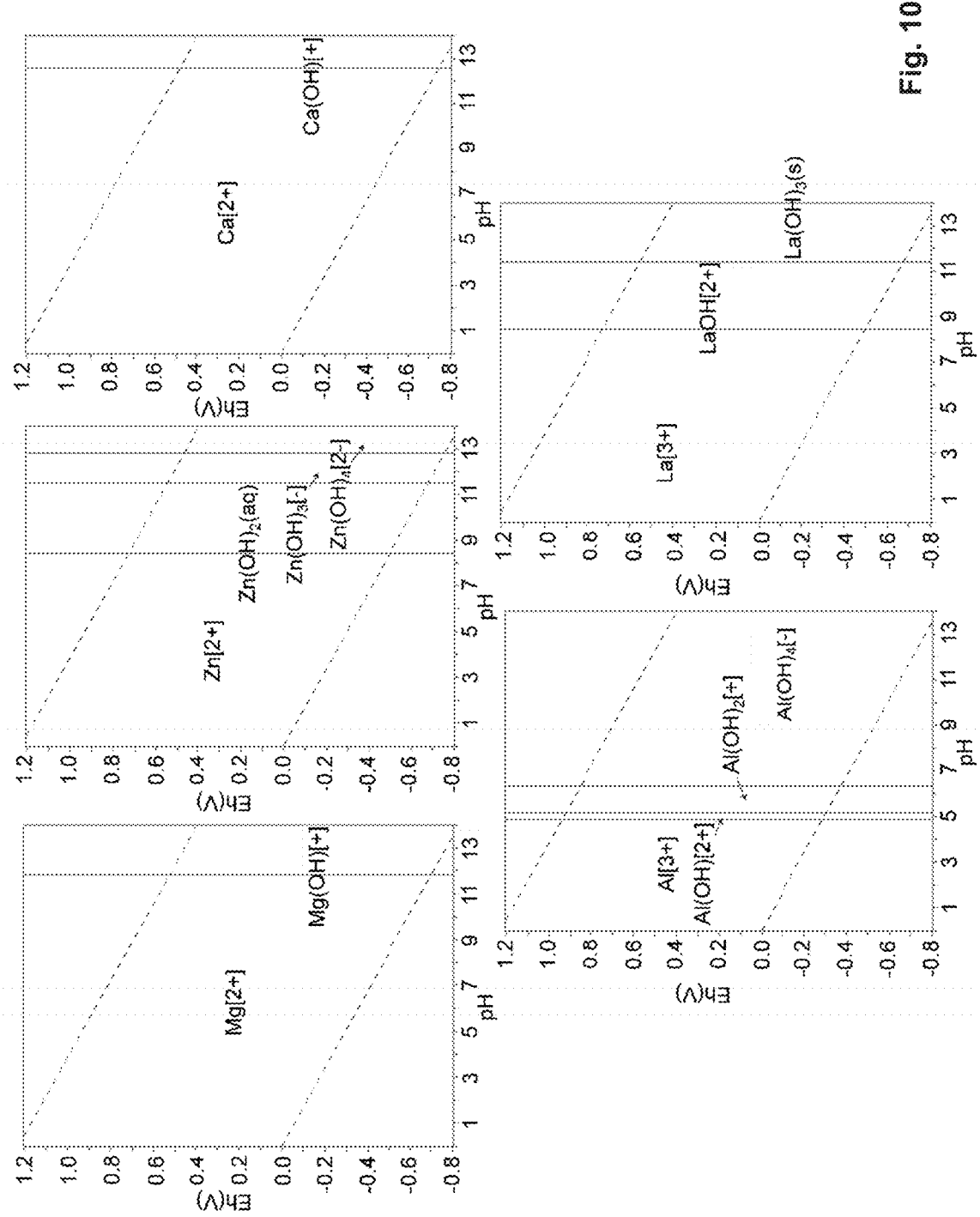
FIG. 10 depicts cation speciation as a function of pH in Pourbaix diagrams ($E_h$-pH diagrams)

Furthermore, the sorption efficiency of chromate ($CrO_4^{2-}$, with Cr$^{6+}$) and material stability during sorption tests at different pH for conventional non-La doped hydrotalcite-type (LDH) materials have been evaluated in FIG. 9 with ZnAl-type hydrotalcites (left) and MgAl-type hydrotalcites (right). As can be seen from FIG. 9, the chromate uptake is strongly dependent on the pH: it decreases with increase of pH (from 8 to 13) due to low material stability at such high pH, and, without being bound to theory, competition with OH$^-$ anions present in the LDH material, strongly limiting the sorption capacity of these materials. Indeed, increasing the pH greatly affects the sorption performances: it is observed from FIG. 9, that the ZnAl-type material is less stable than the MgAl-type material, which is in accordance with the cation speciation as a function of the pH as depicted in the Pourbaix diagrams (or $E_h$—pH diagram) in FIG. 10.

From FIG. 9, it hence follows that non-doped LDH materials can easily be applied for chromate sorption in aqueous streams with a pH ranging from 7 to 10. However, due to their strong material instability in higher alkaline conditions (pH ranging from 10 to 13), it is clear that they are not suited at all to be used as sorbent in this higher range of pH.

Table 2 further summarizes sorption performances measured for non-doped CaAl-type hydrocalumites and MgAl-type hydrotalcites, as well as for La-doped CaAl-type HC and for MgAl-type HT doped with La according to a method of the present disclosure.

TABLE 2

Sorption performances for non-doped and La-doped CaAl HC-type and MgAl HT-type structures

| Sample | cationic ratio | pH | $q_e$ mgCr$^{6+}$/g (max. 20 min) | efficiency % | Mg$^{2+}$ (ppm) | Ca$^{2+}$ (ppm) | Al$^{3+}$ (ppm) | La$^{3+}$ (ppm) |
|---|---|---|---|---|---|---|---|---|
| CaAl | 2/1 | 8 | 5 | 18.21 | — | 134 | 52.3 | — |
| | | 13 | 2 | 7.4 | — | 26.9 | 21.9 | — |
| CaAlLa | 2/0.9/0.1 | 8 | 6 | 22.22 | — | 147 | 49.8 | 0 |
| | | 13 | 7 | 25.9 | — | 29.8 | 10.8 | 0 |
| CaAlLa | 3/0.9/0.1 | 8 | 4 | 14.81 | — | 90 | 47.3 | 0 |
| | | 13 | 0 | 0 | — | 2.53 | 11.9 | 0 |
| CaAlLa | 4/0.9/0.1 | 8 | 4 | 14.81 | — | 103 | 38.5 | 0 |
| | | 13 | 0.2 | 2.86 | — | 26.3 | 11.6 | 0 |
| MgAl | 3/1 | 8 | 29 | 90.63 | 4.22 | — | 0 | — |
| | | 13 | 9 | 32.14 | 0 | — | 6.63 | — |
| MgAlLa | 3/0.95/0.5 | 8 | 25.8 | 99.37 | 19.30 | — | 0.59 | 0 |
| | | 13 | 10 | 37.04 | 0 | — | 0.856 | 0 |
| MgAlLa | 3/0.9/0.1 | 8 | 25.8 | 95.55 | 7.35 | — | 0 | 0 |
| | | 13 | 10 | 37.04 | 0 | — | 0.622 | 0 |

From Table 2 it is observed that sorption performance is increased for the MgAl HT-type materials when compared to the CaAl HC-type materials. Furthermore, at pH 13 the sorption performance for the MgAl HT-type material increases from 32% to 37% with insertion of $La^{3+}$ cations (i.e. for La-doped MgAl HT-type material formed using a method of the present disclosure). At pH 13 extremely low leaching of metal elements from the LDH structure is observed for the La-doped MgAl HT-type materials, i.e. lower than 1.5 ppm per gram material per hour at pH 13.

Figure 11:
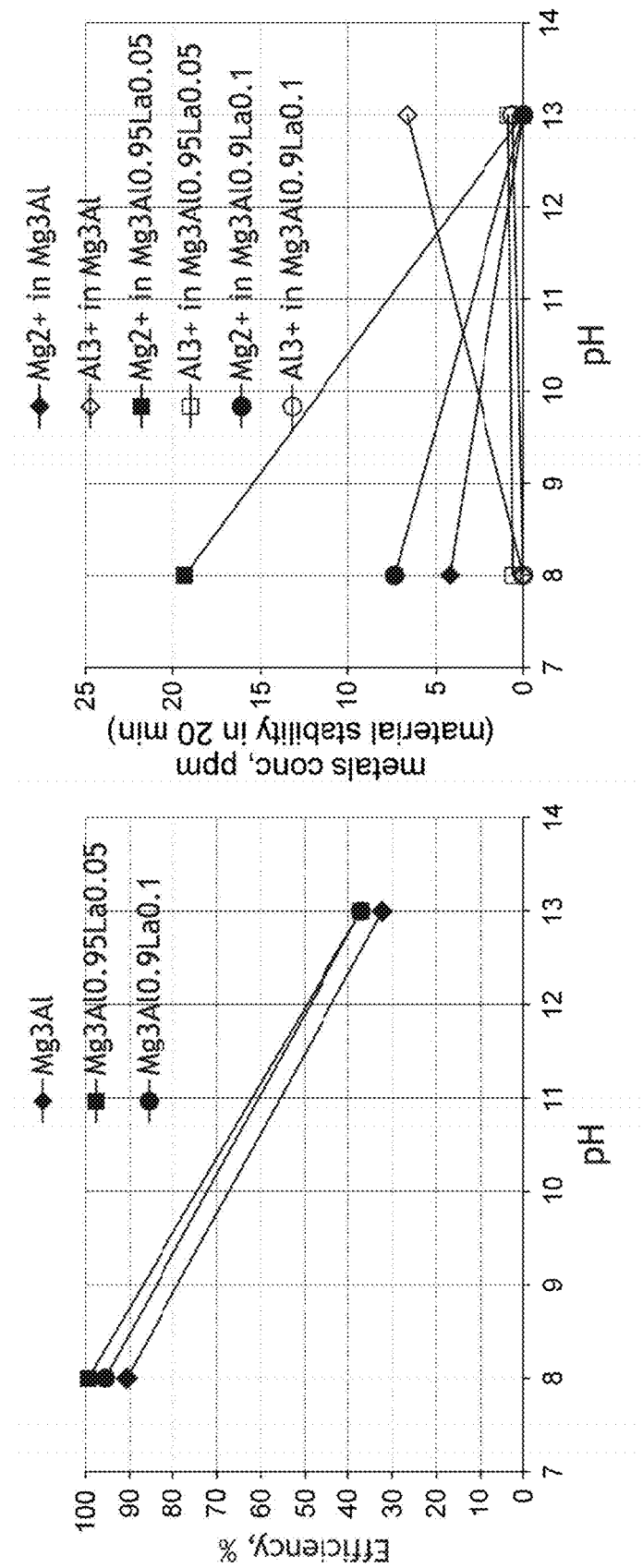
FIG. 11 illustrates the sorption efficiency during sorption tests at different pH (left) and measurements of metal evolution during sorption tests as a function of the pH (right)

FIG. 11 illustrates, for the MgAl HT-type material listed in Table 2, (left) the sorption efficiency during sorption tests at different pH and (right) measurements of metal evolution during sorption tests (i.e. metals leaching from the sorbent material after 20 minutes of sorption experiment, being related with material stability) as a function of the pH.

Figure 12:
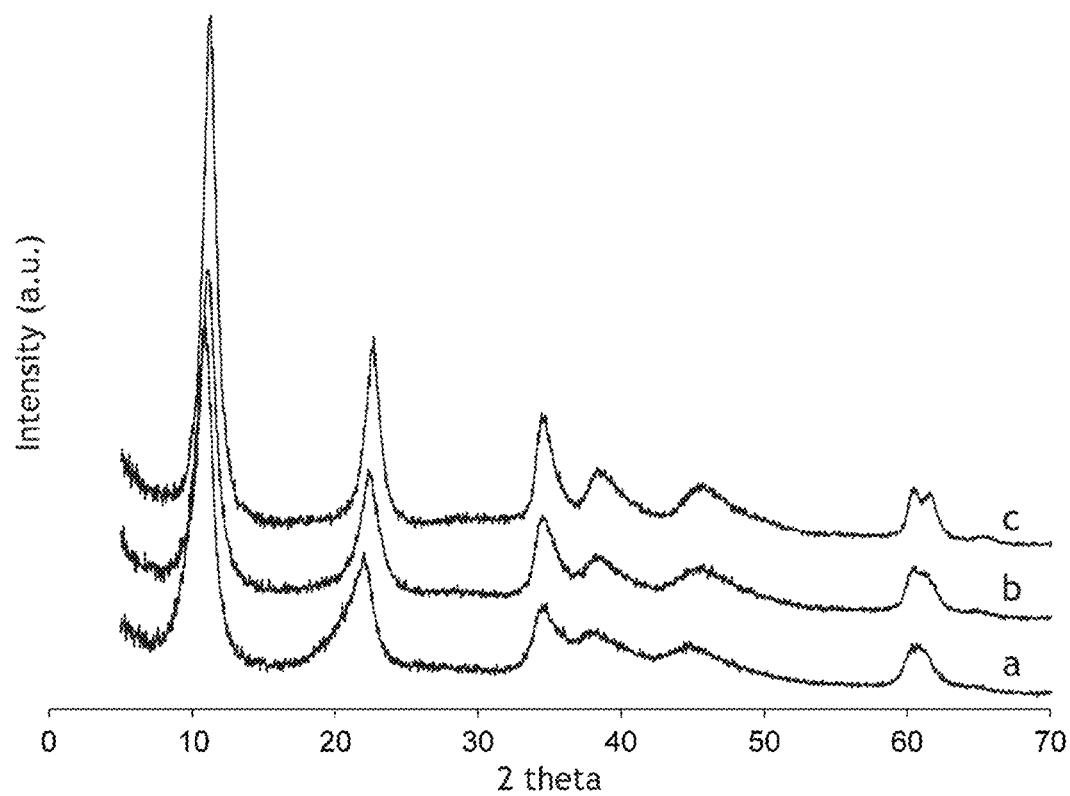
FIG. 12 depicts XRD patterns of La-doped MgAl HT-type material before and after chromate sorption in different pH media: (a) Mg3Al0.9La0.1 (3.3 m % La) as synthesised (cf. Example 1.D, La-doped HT-type material), (b) Mg3Al0.9La0.1 (3.3 m % La) after sorption at pH 8 and (c) Mg3Al0.9La0.1 (3.3 m % La) after sorption at pH 13.

Moreover, it is confirmed by XRD structural characterization, as shown in FIG. 12, that the structure of the La-doped MgAl HT-type material is preserved after the sorption tests at pH 8 and pH 13, the anion exchange being proved by the change in the interlayer spacing (indicated by the unit cell parameter which gives indication on the size of the intercalated anions).

From the above examples, it follows that the La-doped LDHs obtained by a method of the present disclosure are stable in high alkaline media. More particularly, the sorption capacity of the La-doped Mg2+ containing LDHs obtained by a method of the present disclosure is higher compared to the state-of-the-art sorbents when used in high alkaline conditions. Indeed, the La-doped LDH sorbent shows sorption capacity at pH 13 of 10 mg/g sorbent or more (even 15 mg/g up to 30 mg/g sorbent). Therefore, they can be applied as sorbent material directly in high alkaline streams (with pH ranging from 10 to 13.5), with no need of prior reduction of pH. The costly operation of first reducing the pH to a more acidic range (as needed using sorbents known in the art up to now) can hence be avoided.

Even though in the above examples $Mg^{2+}$ containing layered HT-material doped with lanthanide (more particularly lanthanum) have been produced and tested, it will be clear to those skilled in the art that also other types of LDH material doped with lanthanide (more particularly lanthanum) can be produced by the method of the present disclosure, such as $Zn^{2+}$ containing layered HT-material (zaccagnaite, Zn-LDH) doped with lanthanide (more particularly lanthanum).

Example 3: Testing Different Reaction Conditions During the Co-Precipitation Step In this experiment an La-doped HT-material is synthesized in accordance with the experiment described in example 1.D, i.e. using the same reagents but whereas in 1.D the co-precipitation step is performed at room temperature, and a pH of 10, now different pH's and different temperatures during the co-precipitation step were tested.

The results are summarized in Table 1 below and indicate that for a pH in the range of 10-11 there is no influence of the temperature on the formation of La-doped HT-material. At a higher pH and temperature, $La(OH)_3$ starts to segregate from the material. It follows from this experiment that for the La-doped HT-material the pH is preferably between 10 and 11 irrespective of the temperature at which the co-precipitation step is being performed.

TABLE 3

Synthesis conditions and structural characteristics of the La-doped hydrotalcite-type MgAlLa material at different pH and temperatures of co-precipitation step.

| Cationic ratio | La (mol %) | pH of co-precipitation step | T(° C.) of co-precipitation step | Phase observed by XRD | Unit cell parameters of LDH phase |
|---|---|---|---|---|---|
| Mg3Al0.95La0.05 | 1.65 | 10-12 | 1 | LDH | $a_{110}$ = 3.08-3.09 Å $c_{003}$ = 26.27-26.47 Å |
| Mg3Al0.95La0.05 | 1.65 | 10-12 | 15 | LDH | $a_{110}$ = 3.08-3.09 Å $c_{003}$ = 26.21-26.43 Å |
| Mg3Al0.95La0.05 | 1.65 | 10-11 | 30 | LDH | $a_{110}$ = 3.08-3.10 Å $c_{003}$ = 25.78-26.35 Å |

Figure 13:
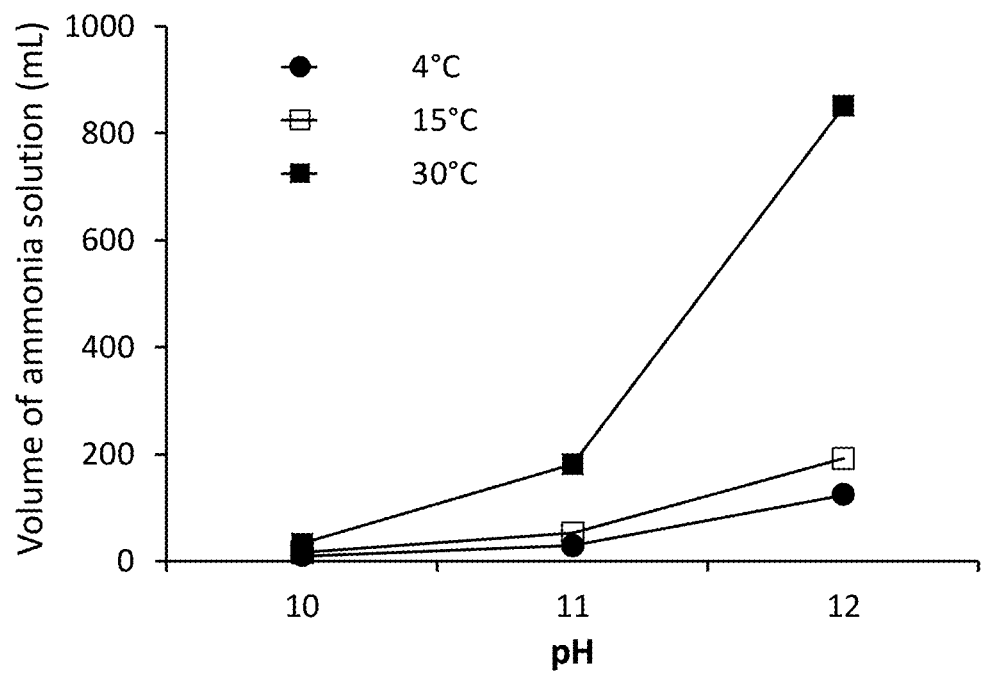
FIG. 13 represents the volume of ammonia solution required for achieving different pH of co-precipitation step during synthesis at different temperatures.

Per reference to FIG. 13, when increasing the temperature during the co-precipitation step larger volumes of the ammonia solution are required to keep the pH at the desired amount (e. g. pH 11-12, more specifically pH 12, at 30° C.). This is due to the endothermic nature of the co-precipitation process which leads to a temperature decrease for the LDH phase formation. Therefore, the increase of temperature will shift the reaction equilibrium towards the initial products and as a consequence, more ammonia has to be added during synthesis for the LDH phase formation.

Thus notwithstanding the fact that the temperature has no direct impact on the La-doped LDH being formed, it is beneficial to perform the co-precipitation reaction at lower temperatures such as up to 15° C. (at the tested temperatures 1° C., 4° or 15° only small volumes of ammonia solution are needed to keep the co-precipitation step at the desired pH) for the economics of the reagents to be used.

Example 4: Testing Different Reaction Conditions During the Aging Step

In this experiment an La-doped HT-material is synthesized in accordance with the experiment described in example 1.D, i.e. using the same reagents but whereas in 1.D the co-precipitation step is performed at room temperature, and a pH of 10 with an aging of the precipitate at 65° C. for 24 h. The co-precipitation was now done at a pH of 11, and we tested different temperatures for the aging step.

The results are summarized in Table 4 and indicate that even around room temperature a high degree of crystallinity is obtained, without segregation.

TABLE 4

Synthesis conditions and structural characteristics
of the La-doped hydrotalcite-type MgAlLa material
at different temperatures of aging step.

| Cationic ratio | La (mol %) | pH of aging step | T(° C.) of aging | Phase observed by XRD | Unit cell parameters of LDH phase |
|---|---|---|---|---|---|
| Mg3Al0.95La0.05 | 1.65 | 11 | 15 | LDH | $a_{110}$ = 3.09 Å $c_{003}$ = 26.37 Å |
| Mg3Al0.95La0.05 | 1.65 | 11 | 30 | LDH | $a_{110}$ = 3.08 Å $c_{003}$ = 26.41 Å |

Example 5: Testing Different Lanthanides

To test the feasibility of synthesizing other lanthanides comprising LDHs wherein the lanthanide is doped into the brucite-like layer of the layered double hydroxides without segregation, other lanthanides were tested using the protocol as described in example 1.D. The co-precipitation step being performed at pH 11 and at 15° C. and the aging step at 30° C.

Figure 14:
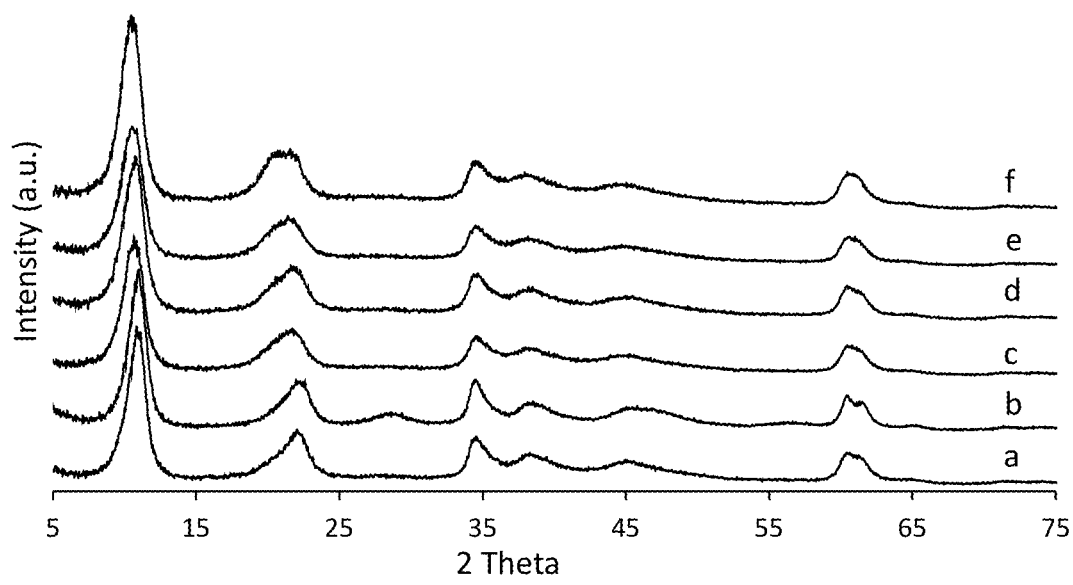
FIG. 14 represents XRD patterns of (a) Mg3Al0.95La0.05 (1.65 m % La), (b) Mg3Al0.95Ce0.05 (1.65 m % Ce), (c) Mg3Al0.95Eu0.05 (1.65 m % Eu), (d) Mg3Al0.95Tb0.05 (1.65 m % Tb), (e) Mg3Al0.95Gd0.05 (1.65 m % Gd) and (f) Mg3Al0.95Yb0.05 (1.65 m % Yb)

The crystalline structure of the obtained LDH material is then investigated via X-ray diffraction analysis (XRD) and shown in FIG. 14. It is evident, and when compared to the X-Ray diffraction of the Lanthanum-doped material (a), that the crystalline structure of all tested lanthanides is effectively the same.

Figure 15:
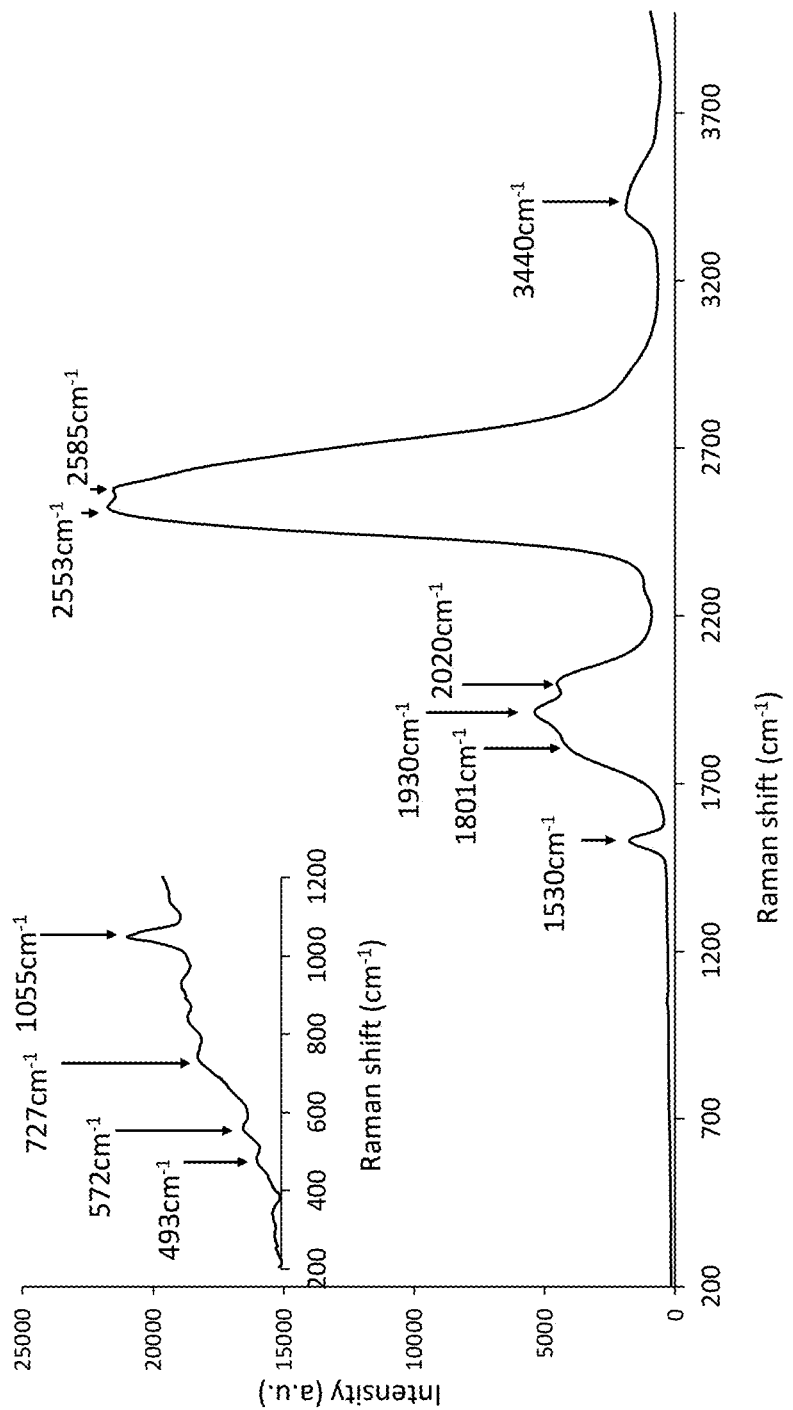
FIG. 15 represents Raman spectra of the Mg3Al0.95Eu0.05 (1.65 m % Eu) and the inset is an enlarged view in the spectral range below 1200 cm$^{-1}$.

In addition, the materials doped with europium (Eu) or terbium (Tb) have fluorescent properties as evident from the Raman spectra shown for Eu in FIG. 15.

Referring to FIG. 15, Raman measurements were done using a HORIBA XploRA PLUS V1.2 MULTILINE Cofocal Raman microscope under the same setting conditions. A 532 nm diode-pumped solid-state (DPSS) laser with a power of 25 mW was used for excitation and all the spectra were collected with an accumulation time of 10 s.

The low spectra range (below 1200 cm$^{-1}$) is enlarged for better clarity due to the high intensity of the fluorescence bands above 1500 cm$^{-1}$. The Raman spectra above 1500 cm$^{-1}$ comprises the total luminescence of Europium. Detailed assignment of Raman bands is included in Table 5.

TABLE 5

Assignment of Raman bands of FIG. 15

| Raman shift, cm$^{-1}$ | Assignment | Reference |
|---|---|---|
| 493 | EgT vibration mode of M-OH in LDH lattice | 1, 2 |
| 572 | EuT vibration mode of M-OH in LDH lattice | 1, 2 |
| 740 | EuR(OH) vibration mode | 1, 2 |
| 1055 | Vibration mode of nitrate anions in the interlayer (fingerprint) | 1, 2 |
| 1530 | Eu$^{3+}$ transition | 3, 4 |
| 1801, 1930, 2020 | Characteristic split of luminescence bands assigned to Eu$^{3+}$ (fingerprint) | 3, 4 |
| 2553, 2585 | Split of electronic transition $^5D_0$-$^7F_1$ of Eu$^{3+}$ | 4 |
| 3450 | Electronic transition $^5D_0$-$^7F_2$ of Eu$^{3+}$ | 4 |

References:
1. E. M. Seftel et. al, Applied Clay Science 165 (2018) 234-246.
2. S. S. C. Pushparaj et. al, J. Phys. Chem. C 119 (49) (2015) 27695-27707.
3. Tao Wu et al, Anal. Chem. 88 (2016) 8878-8885.
4. C. Tiseanu et. al, Phys. Chem. Chem. Phys. 14 (2012) 12970-12981.

Example 6: Synthesis of Methyl Octyl Carbonate—Catalyst Testing

Besides the commercial hydrotalcite catalytic material, the catalytic activity of the lantanide doped materials obtained using the method of the present disclosure, hereinafter referred to as MK14 and MK51, were tested in a catalytic reaction. The synthesis route for the lanthanide doped materials are summarized in Table 6.

Firstly, three samples of catalyst-hydrotalcite (MK8-14, MK51-35C and commercial hydrotalcite (called H550—Sigma_Aldrich—CAS Number 11097-59-9) were tested catalytically, pretreated under calcination at 550° C. for 5 hours. After that, the catalysis with strong acids (as homogeneous catalysts for comparison) (Toluenesulfonic acid (TSO$_3$H) and H$_2$SO$_4$)) was carried out according to the following protocol; wherein the chemicals and the amounts used, calculations, for each of the tested catalysts are indicated in Tables 7.1-7.5. below:

A g of 1-Octanol and B mL of Dimethyl carbonate (DMC) were mixed in a 50 mL round bottom flask. When a good mixture of the reactants was reached, x gram of hydrotalcite (10% mass of 1-Octanol) and acids were added, respectively.

The reaction was carried out for 22 hours at 90° C. During the reaction, samples were taken out for GC-MS analysis after 2 h, 4 h, 5.5 h and 22 h.

Figure 16:
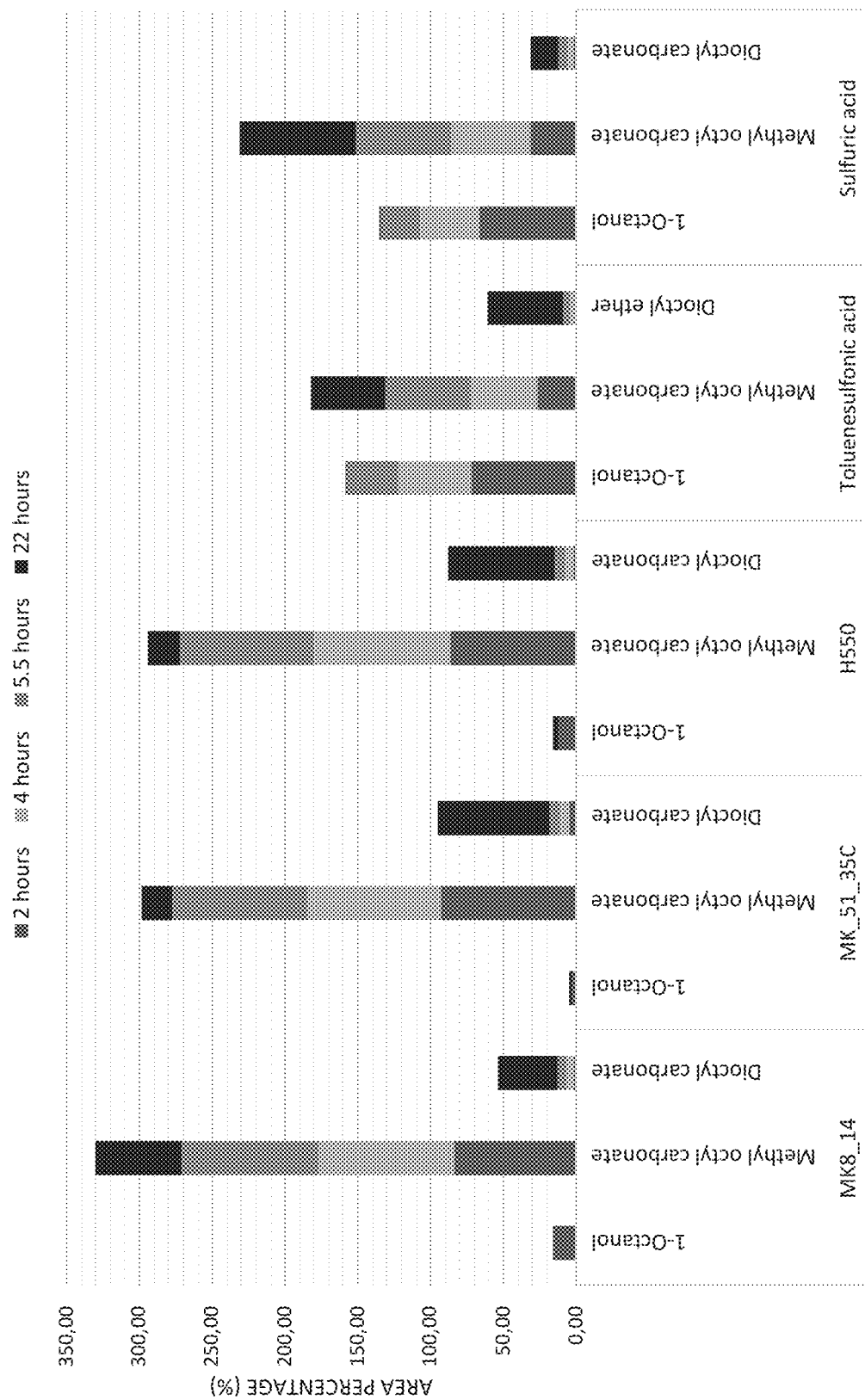
FIG. 16 represents catalytic results for conversion of 1-octanol into Methyl octyl carbonate and Dioctyl carbonate by MK8-14, MK51-35C, Hydrotalcite, Toluenesulfonic acid, and Sulfuric acid, indicated as area percentages of the peaks in GC-MS after 2h, 4h, 5.5h, and 22 hours of reaction.

The catalytic results are given in FIG. 16 after analysis with GC-MS after 2 h, 4 h, 5.5 h and 22 h. The area percentages of the detected peaks were calculated for 1-octanol and the reaction products Methyl octyl carbonate and Dioctyl carbonate, respectively and plotted (graph x).

TABLE 6

Synthesis route for MK8_14 and MK51-35C (Aging time: 24 hours; RT: room temperature)

| sample name | sample description | salt solution volume (ml) | precipitant | amount precipitant (ml) | synthesis temp | Aging Temp (° C.) | pH | pH after synthesis | drying temp | amount of powder (g) |
|---|---|---|---|---|---|---|---|---|---|---|
| MK8_14 pH 11 | Mg3Al0.95La0.05—NO3 | 100 | Ammonia 28-30% | 72 | RT | RT | 11.00 | 10.4 | 60 | 7.49 |
| MK 51-35C | Mg3Al0.95La0.05—NO3 | 100 | Ammonia 25% | 200 | RT | 65 | 11.00 | 10.26 | 60 | 7.64 |

TABLE 7.1

Chemicals and amounts used, calculations (catalyst is MK8-14)

| MK8_14 | M (g/mol) | m (g) | Density d | ml | n (mol) | Equivalent | DATA |
|---|---|---|---|---|---|---|---|
| 1-Octanol | 130.23000 | 10.06390 (A) | | | 0.07728 | 1.00000 | GC MS: |
| DMC | 90.08000 | 34.80596 (B) | 1.07000 | | 0.38639 | 5.00000 | 2 h, 4 h, |
| Hydrotalcite | | 1.00639 (x) | | | | 10% mass | 5.5 h, 22 h |

TABLE 7.2

Chemicals and amounts used, calculations (catalyst is MK51-3SC)

| MK51-35C | M (g/mol) | m (g) | density d | ml | n (mol) | Equivalent | DATA |
|---|---|---|---|---|---|---|---|
| 1-Octanol | 130.23000 | 10.13190 (A) | | | 0.07780 | 1.00000 | GC MS: |
| DMC | 90.08000 | 33.92350 (B) | 1.07000 | | 0.38900 | 5.00000 | 2 h, 4 h, |
| Hydrotalcite | | 1.05040 (x) | | | | 10% mass | 5.5 h, 22 h |

TABLE 7.3

Chemicals and amounts used, calculations (catalyst is hydrotalcite H550)

| Commercial H550 | M (g/mol) | m (g) | Density d | ml | n (mol) | Equivalent | yield (%) | DATA |
|---|---|---|---|---|---|---|---|---|
| 1-Octanol | 130.23000 | 10.10390 (A) | | | 0.07759 | 1.00000 | | GC MS: |
| DMC | 90.08000 | 34.21220 (B) | 1.07000 | | 0.38793 | 5.00000 | | 2 h, 4 h, |
| Hydrotalcite | | 1.06520 (x) | | | | 10% mass | | 5.5 h, 22 h |

TABLE 7.4

Chemicals and amounts used, calculations (catalyst is toluenesulfonic acid)

| Toluenesulfonic acid | M (g/mol) | m (g) | Density d | ml | n (mol) | Equivalent | DATA |
|---|---|---|---|---|---|---|---|
| 1-Octanol | 130.23000 | 10.05950 (A) | | | 0.07724 | 1.00000 | GC MS: |
| DMC | 90.08000 | 33.69790 (B) | | | 0.38622 | 5.00000 | 2 h, 4 h, |
| Toluenesulfonic acid monohydrate | 190.20000 | 0.76250 (x) | 1.24000 | 0.61492 | 0.00386 | 0.05000 | 5.5 h, 22 h |

TABLE 7.5

Chemicals and amounts used, calculations (catalyst is $H_2SO_4$)

| $H_2SO_4$ | M (g/mol) | m (g) | Density d | ml | n (mol) (1H+) | Equivalent | DATA |
|---|---|---|---|---|---|---|---|
| 1-Octanol | 130.23000 | 10.10370 (A) | | | 0.07758 | 1.00000 | GC MS: |
| DMC | 90.08000 | 34.33300 (B) | | | 0.38792 | 5.00000 | 2 h, 4 h, |
| $H_2SO_4$ (98%) | 98.07900 | 0.19023 (x) | 1.84000 | 0.10000 | 0.00388 | 0.05000 | 5.5 h, 22 h |

The invention claimed is:

1. A method for producing lanthanide doped layered double hydroxides (Ln-doped LDHs), the method comprising:
   a) preparing a carbonate free alkaline solution;
   b) preparing a solution of metal salts comprising a salt of a lanthanide;
   c) adding the alkaline solution and the solution of metal salts to form a mixture, wherein a speed of adding the alkaline solution or of adding the solution of metal salts is set such that a pH of the mixture is maintained at a constant value so as to form Ln-doped LDH precipitate;
   d) aging the precipitate; and
   e) separating the precipitate from the mixture;

wherein the carbonate free alkaline solution is an aqueous ammonia solution; and wherein the lanthanide doped layered double hydroxides have a crystal structure having a unit cell with lattice parameter $a_{110}$ at least 1.6% larger than lattice parameter $a_{110}$ of a unit cell of the crystal structure of layered double hydroxides that are not lanthanide doped.

2. The method of claim 1, wherein the aqueous ammonia solution has a $NH_3$ concentration between 20% w/w and 30% w/w.

3. The method of claim 1, wherein adding the alkaline solution and the solution of metal salts comprises adding the alkaline solution at a speed between 5 mL/min and 10 mL/min per liter of the solution of metal salts.

4. The method of claim 1, wherein in step (c) the pH of the formed mixture is comprised between 9 and 13.

5. The method of claim 1, wherein step (c) is performed at a temperature comprised between 1° C. and 65° C.

6. The method of claim 1, wherein the solution of metal salts comprises a salt of a lanthanide, and salts of one or more of divalent, trivalent, and tetravalent metal cations.

7. The method of claim 6 wherein in the solution of metal salts the cationic ratios of Me2+/(Me3+ and/or Me4+)/Ln3+ are 2-4/0.8-0.95/0.05-0.2, wherein Me refers to a metal element.

8. The method of claim 6, wherein the solution of metal salts comprises a salt of a lanthanide, aluminium and one or more of calcium, magnesium, and zinc.

9. The method of claim 8, wherein in the solution of metal salts the molar ratio of Ca/Al/Ln is 2 to 4/0.5 to 0.95/0.05 to 0.5, or the molar ratio of Mg/Al/Ln is 2 to 4/0.5 to 0.95/0.05 to 0.5, or the molar ratio of Zn/Al/Ln is 2 to 4/0.5 to 0.95/0.05 to 0.5.

10. The method of claim 8, wherein the solution of metal salts comprises a salt of a lanthanide, aluminium, and magnesium.

11. The method of claim 10, wherein in the solution of metal salts the molar ratio between Mg, Al and Ln is $Mg_xAl_yLn_z$, wherein x is between 2 and 4, y is between 0.9 and 0.95, and z is between 0.05 and 0.1.

12. The method of claim 1, wherein the solution of metal salts comprises:

$CaCl_2 \cdot 2H_2O$, $AlCl_3 \cdot 6H_2O$ and $LaCl_3 \cdot 7H_2O$; or
$Mg(NO_3)_2 \cdot 6H_2O$, $Al(NO_3)_3 \cdot 9H_2O$ and $La(NO_3)_3 \cdot 6H_2O$; or
$Zn(NO_3)_2 \cdot 6H_2O$, $Al(NO_3)_3 \cdot 9H_2O$ and $La(NO_3)_3 \cdot 6H_2O$.

13. The method of claim 1, wherein step (d) is performed for a period of at least 1 hour at a temperature being comprised between 1° C. and 150° C.

14. The method of claim 13, wherein step d) comprises maintaining the precipitate and the mixture in contact with each other at a temperature between 1° C. and 65° C.

15. The method of claim 1, further comprising:

using the lanthanide doped layered double hydroxides as sorbent for anions.

16. The method of claim 15, wherein the lanthanide doped layered double hydroxides are used as sorbent for anions at a pH between 7 and 14.

17. The method of claim 1, further comprising:

using the lanthanide doped layered double hydroxides as catalyst in a chemical reaction.

18. The method of claim 17, wherein the lanthanide doped layered double hydroxides are used as catalyst at a pH between 7 and 14.

* * * * *